United States Patent [19]
Johnson et al.

[11] Patent Number: 5,878,245
[45] Date of Patent: Mar. 2, 1999

[54] HIGH PERFORMANCE LOAD/STORE FUNCTIONAL UNIT AND DATA CACHE

[75] Inventors: William M. Johnson; David B. Witt; Murali Chinnakonda, all of Austin, Tex.

[73] Assignee: Advanced Micro Devices, Inc., Sunnyvale, Calif.

[21] Appl. No.: 146,376

[22] Filed: Oct. 29, 1993

[51] Int. Cl.[6] .................................................. G06F 12/02
[52] U.S. Cl. ...................... 395/481; 395/458; 395/467; 395/800
[58] Field of Search .................................. 395/425, 375, 395/800, 458, 467, 476, 481

[56] References Cited

U.S. PATENT DOCUMENTS

| | | | |
|---|---|---|---|
| 4,155,119 | 5/1979 | DeWard et al. | 395/416 |
| 4,453,212 | 6/1984 | Gaither et al. | 395/402 |
| 4,736,288 | 4/1988 | Shintani et al. | 395/375 |
| 4,807,115 | 2/1989 | Torng | 395/375 |
| 4,926,322 | 5/1990 | Stimac et al. | 395/500 |
| 5,056,006 | 10/1991 | Acharya et al. | 395/474 |
| 5,133,062 | 7/1992 | Joshi et al. | 395/500 |
| 5,136,697 | 8/1992 | Johnson | 395/375 |
| 5,155,816 | 10/1992 | Kohn | 395/375 |
| 5,155,820 | 10/1992 | Gibson | 395/375 |
| 5,226,126 | 7/1993 | McFarland et al. | 395/375 |
| 5,226,130 | 7/1993 | Favor et al. | 395/375 |
| 5,233,694 | 8/1993 | Hotta et al. | 395/375 |
| 5,233,696 | 8/1993 | Suzuki | 395/375 |
| 5,274,790 | 12/1993 | Suzuki | 395/458 |
| 5,291,615 | 3/1994 | Okamoto | 395/800 |
| 5,325,499 | 6/1994 | Kummer et al. | 395/470 |
| 5,390,355 | 2/1995 | Horst | 395/800 |
| 5,434,987 | 7/1995 | Abramson et al. | 395/375 |
| 5,454,117 | 9/1995 | Puziol et al. | 395/800 |
| 5,467,473 | 11/1995 | Kahle et al. | 395/800 |

FOREIGN PATENT DOCUMENTS

| | | |
|---|---|---|
| 0140533 A3 | 5/1985 | European Pat. Off. . |
| 0170525 a2 | 2/1986 | European Pat. Off. . |
| 0259095 A2 | 3/1988 | European Pat. Off. . |
| 0350141 | 1/1990 | European Pat. Off. . |
| 0380584 A3 | 8/1990 | European Pat. Off. . |
| 0459232 A2 | 12/1991 | European Pat. Off. . |
| 0 533 337 | 8/1992 | European Pat. Off. . |
| 2273835 | 6/1994 | United Kingdom . |

OTHER PUBLICATIONS

Yoshida et al., "The Approach to Multiple Instruction Execution in the GMICRO/400 Processor", Feb. 1991 IEEE pp. 185–195.

U.S. application No. 08/146,381 filed Oct. 29, 1993 entitled "Linearly Addressable Microprocessor Cache"—David B. Witt, Attorney Docket M–2412 US.

Mike Johnson, "Superscalar Microprocessor Design", (Prentice Hall series in innovative technology), 1991, pp. 261–272.

Robert B.K. Dewar, et al., "Microprocessors A Programmer's View", 1990, Chapter 4, pp. 103–134.

David A. Patterson, et al., "Computer Architecture A Quantitive Approach", Copyright 1990, Chapter 8, pp. 403–497.

U.S. application No. 08/233,567 filed Apr. 26, 1994 entitled "Dependency Checking and Forwarding of Variable Width Operands"—Gerald D. Zuraski, Jr., Scott A. White, Murali Chinnakonda, and David S. Christie, Attorney Docket No. M–2284 US.

(List continued on next page.)

*Primary Examiner*—Eddie P. Chan
*Assistant Examiner*—Kevin L. Ellis
*Attorney, Agent, or Firm*—Skjerven, Morrill, MacPherson, Franklin & Friel; Stephen A. Terrile

[57] ABSTRACT

A load/store functional unit and a corresponding data cache of a superscalar microprocessor is disclosed. The load/store functional unit includes a plurality of reservation station entries which are accessed in parallel and which are coupled to the data cache in parallel. The load/store functional unit also includes a store buffer circuit having a plurality of store buffer entries. The store buffer entries are organized to provide a first in first out buffer where the outputs from less significant entries of the buffer are provided as inputs to more significant entries of the buffer.

28 Claims, 23 Drawing Sheets

OTHER PUBLICATIONS

Gurindar S. Sohi, "Instruction Issue Logic for High–Performance, Interruptible, Multiple Functional Unit, Pipelined Computers", ©1990, pp. 349–359.

Mike Johnson, "Superscalar Microprocessor Design", ©1991, pp. 50–53, section 3.4.4; pp. 129–133, section 7.1; and pp. 147–163, Chapter 8. p. 44–48 & Appendix.

IBM Technical Disclosure Bulletin, "High Speed Buffer with Dual Directories", vol. 26, No. 12, May 1984, pp. 6264–6265.

Brian Case, "AMD Unveils First Superscalar 29K Core", *Microprocessor Report*, Oct. 24, 1994, pp. 23–26.

Michael Slater, "AMD's K5 Designed to Outrun Pentium", *Microprocessor Report*, Oct. 24, 1994, pp. 1, 6–11.

Robert M. Supnik, "Digital's Alp", Feb. 1993, Communications of the ACM, pp. 30, 32–44.

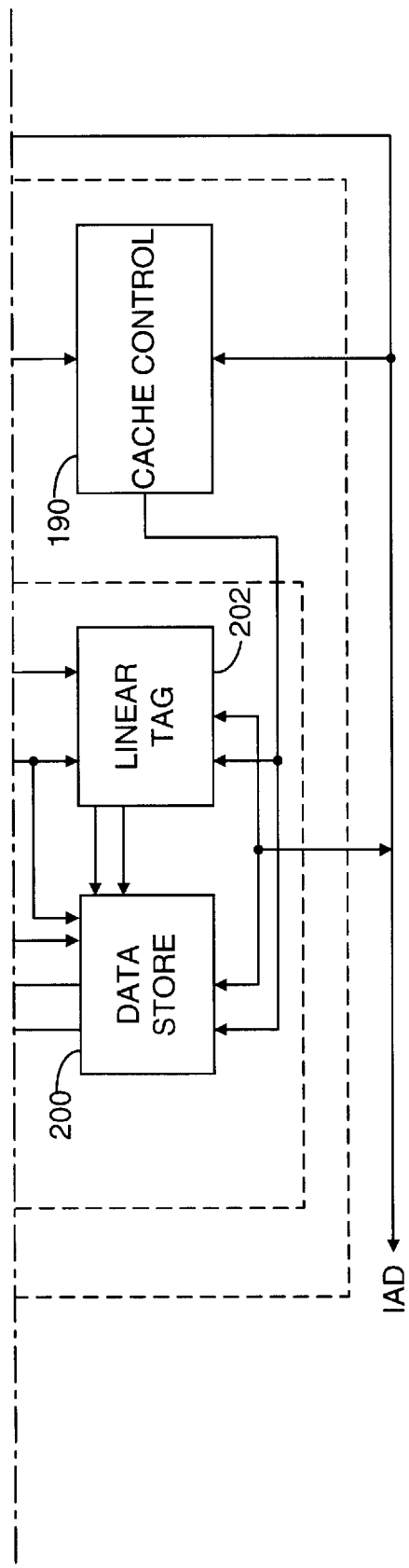

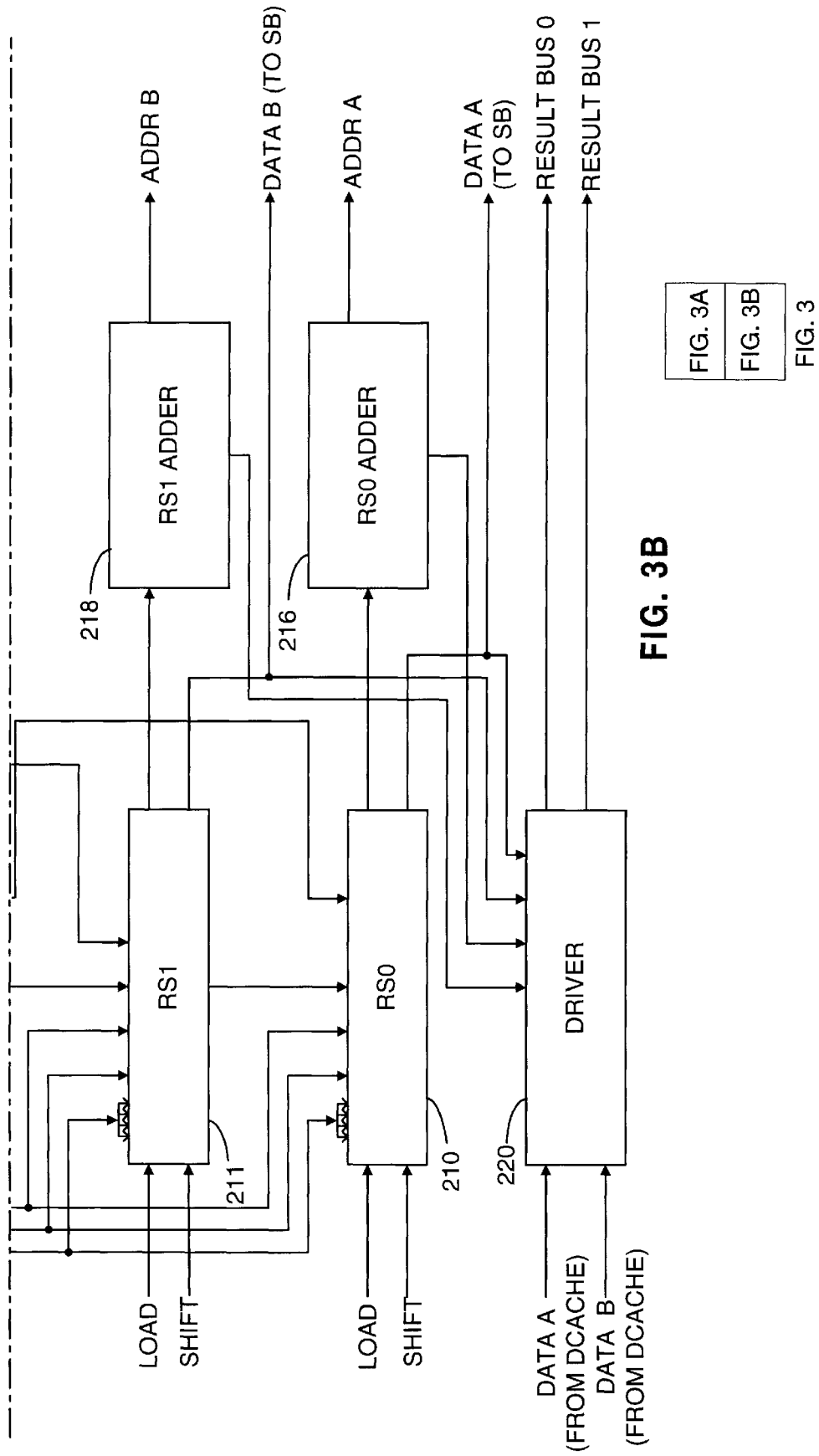

| V | A OPERAND | B OPERAND | DISPLACEMENT | DTAG | OPCODE | INSLS |

| BTAGU | V | BTAGM | V | BTAGL | V | ATAGU | V | ATAGM | V | ATAGL | V | C |

FIG. 4

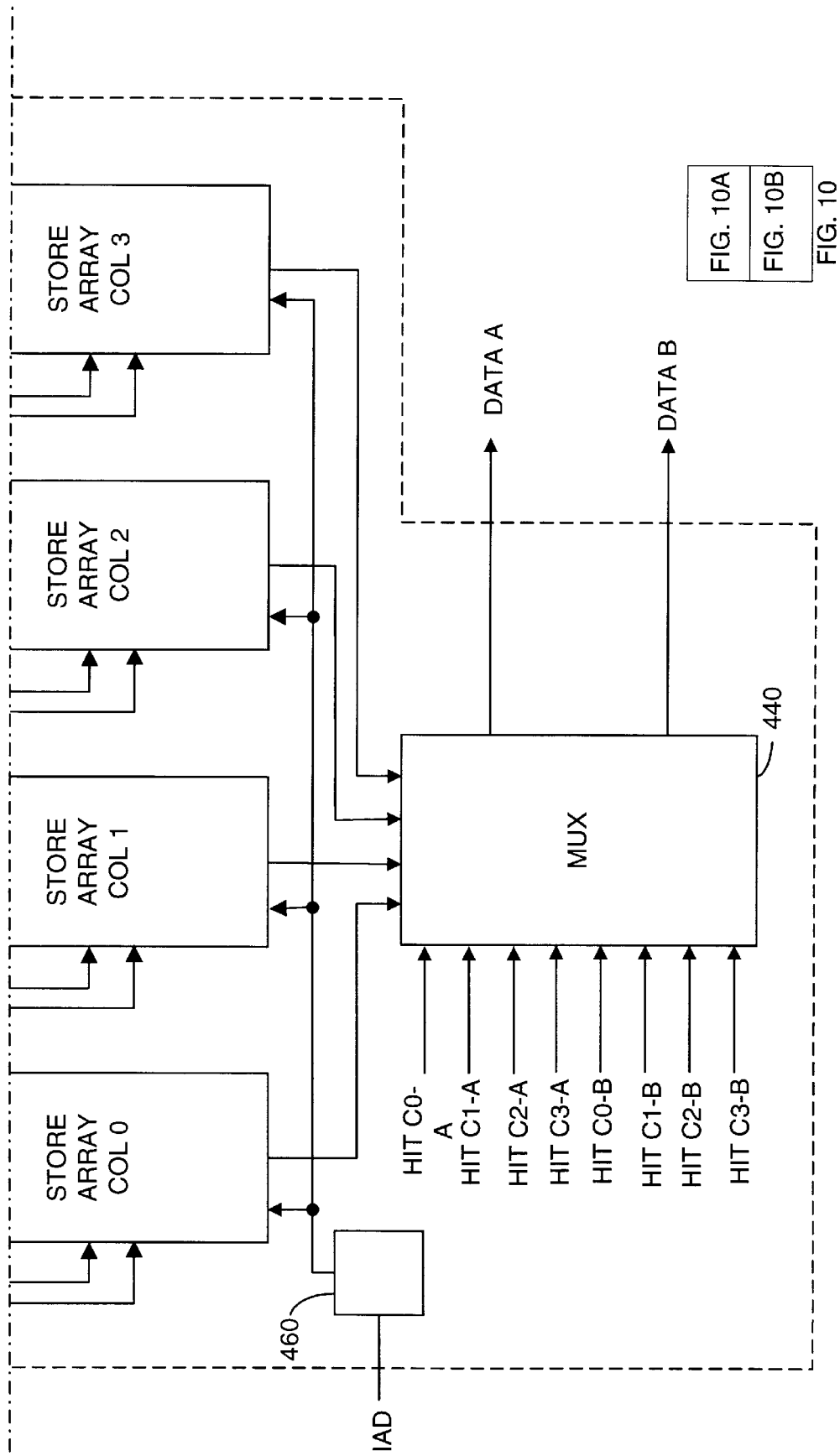

HIGH PERFORMANCE LOAD/STORE FUNCTIONAL UNIT AND DATA CACHE

CROSS REFERENCE TO RELATED APPLICATIONS

This patent application is related to the copending U.S. patent application Ser. No. 08/146,381 entitled "Linearly Addressable Microprocessor Cache" by David B. Witt.

This patent application is related to the copending U.S. patent application Ser. No. 08/223,567 entitled "Dependency Checking and Forwarding of Variable Width Operands" by Gerald D. Zuraski, Jr., Scott A. White, Murali Chinnakonda, and David S. Chrisitie.

BACKGROUND OF THE INVENTION

The present invention relates to microprocessors, and, more particularly, to providing microprocessors with high performance data caches and load/store functional units.

Microprocessors are processors which are implemented on one or a very small number of semiconductor chips. Semiconductor chip technology is ever increasing the circuit densities and speeds within microprocessors; however, the interconnection between the microprocessor and external memory is constrained by packaging technology. Though on-chip interconnections are extremely cheap, off-chip connections are very expensive. Any technique intended to improve microprocessor performance must take advantage of increasing circuit densities and speeds while remaining within the constraints of packaging technology and the physical separation between the processor and its external memory. While increasing circuit densities provide a path to evermore complex designs, the operation of the microprocessor must remain simple and clear for users to understand how to use the microprocessor.

While the majority of existing microprocessors are targeted toward scalar computation, superscalar microprocessors are the next logical step in the evolution of microprocessors. The term superscalar describes a computer implementation that improves performance by a concurrent execution of scalar instructions. Scalar instructions are the type of instructions typically found in general purpose microprocessors. Using today's semiconductor processing technology, a single processor chip can incorporate high performance techniques that were once applicable only to large-scale scientific processors. However, many of the techniques applied to large scale processors are either inappropriate for scalar computation or too expensive to be applied to microprocessors.

A microprocessor runs application programs. An application program comprises a group of instructions. In running the application program, the processor fetches and executes the instructions in some sequence. There are several steps involved in the executing even a single instruction, including fetching the instruction, decoding it, assembling its operands, performing the operations specified by the instruction, and writing the results of the instruction to storage. The execution of instructions is controlled by a periodic clock signal. The period of the clock signal is the processor cycle time.

The time taken by a processor to complete a program is determined by three factors: the number of instructions required to execute the program; the average number of processor cycles required to execute an instruction; and, the processor cycle time. Processor performance is improved by reducing the time taken, which dictates reducing one or more of these factors.

One way to improve performance of the microprocessor is by overlapping the steps of different instructions, using a technique called pipelining. To pipeline instructions, the various steps of instruction execution are performed by independent units called pipeline stages. Pipeline stages are separated by clocked registers. The steps of different instructions are executed independently in different pipeline stages. Pipelining reduces the average number of cycles required to execute an instruction, though not the total amount of time required to execute an instruction, by permitting the processor to handle more than one instruction at a time. This is done without increasing the processor cycle time appreciably. Pipelining typically reduces the average number of cycles per instruction by as much as a factor of three. However, when executing a branch instruction, the pipeline may sometimes stall until the result of the branch operation is known and the correct instruction is fetched for execution. This delay is known as the branch-delay penalty. Increasing the number of pipeline stages also typically increases the branch-delay penalty relative to the average number of cycles per instruction.

Another way to improve processor performance is to increase the speed with which the microprocessor assembles the operands of an instruction and writes the results of the instruction; these functions are referred to as a load and a store, respectively. Both of these functions depend upon the microprocessor's use of its data cache.

During the development of early microprocessors, instructions took a long time to fetch compared to the execution time. This motivated the development of complex instruction set computer (CISC) processors. CISC processors were based on the observation that given the available technology, the number of cycles per instruction was determined mostly by the number of cycles taken to fetch the instruction. To improve performance, the two principal goals of the CISC architecture were to reduce the number on instructions needed for a given task and to encode these instructions densely. It was acceptable to accomplish these goals by increasing the average number of cycles taken to decode and execute an instruction because using pipelining, the decode and execution cycles could be mostly overlapped with a relatively lengthy instruction fetch. With this set of assumptions, CISC processors evolved densely encoded instructions at the expense of decode and execution time inside the processor. Multiple-cycle instructions reduced the overall number of instructions and thus reduced the overall execution time because they reduced the instruction fetch time.

In the late 1970's and early 1980's, memory and packaging technology changed rapidly. Memory densities and speed increased to the point where high speed local memories called caches could be implemented near the processor. Caches are used by the processor to temporarily store instructions and data. When instructions are fetched more quickly using caches, the performance is limited by the decode and execution time that was previously hidden within the instruction fetch time. The number of instructions does not affect performance as much as the average number of cycles taken to execute an instruction.

The improvement in memory and packaging technology, to the point where instruction fetching did not take much longer than instruction execution, motivated the development of reduced instruction set computer (RISC) processors. To improve performance, the principal goal of a RISC architecture is to reduce the number of cycles taken to execute an instruction, allowing some increase in the total number of instructions. The trade-off between cycles per instruction and the number of instructions is not one to one. Compared to CISC processors, RISC processors typically reduce the number of cycles per instruction by factors of three to five, while they typically increase the number of instructions by thirty to fifty percent. RISC processors rely on auxiliary features such as a large number of general purpose registers, and instruction and data caches to help the compiler reduce the overall instruction count or to help reduce the number of cycles per instruction.

A typical RISC processor executes one instruction on every processor cycle. A superscalar processor reduces the average number of cycles per instruction beyond what is possible in a pipelined scalar RISC processor by allowing concurrent execution of instructions in the same pipeline stage as well as concurrent execution of instructions in different pipeline stages. The term superscalar emphasizes multiple concurrent operations on scalar quantities as distinguished from multiple concurrent operations on vectors or arrays as is common in scientific computing.

While superscalar processors are conceptually simple, there is more to achieving increased performance than widening a processor's pipeline. Widening the pipeline makes it possible to execute more than one instruction per cycle but there is no guarantee that any given sequence of instructions can take advantage of this capability. Instructions are not independent of one another but are interrelated; these interrelationships prevent some instructions from occupying the same pipeline stage. Furthermore, the processor's mechanisms for decoding and executing instructions can make a big difference in its ability to discover instructions that can be executed at simultaneously.

Superscalar techniques largely concern the processor organization independent of the instruction set and other architectural features. Thus, one of the attractions of superscalar techniques is the possibility of developing a processor that is code compatible with an existing architecture. Many superscalar techniques apply equally well to either RISC or CISC architectures. However, because of the regularity of many of the RISC architectures, superscalar techniques have initially been applied to RISC processor designs.

The attributes of the instruction set of a RISC processor that lend themselves to single cycle decoding also lend themselves well to decoding multiple RISC instructions in the same clock cycle. These include a general three operand load/store architecture, instructions having only a few instruction lengths, instructions utilizing only a few addressing modes, instructions which operate on fixed-width registers and register identifiers in only a few places within the instruction format. Techniques for designing a superscalar RISC processor are described in *Superscalar Microprocessor Design*, by William Michael Johnson, 1991, Prentice-Hall, Inc. (a division of Simon & Schuster), Englewood Cliffs, N.J.

In contrast to RISC Architectures, CISC architectures use a large number of different instruction formats. One CISC microprocessor architecture which has gained wide-spread acceptance is the x86 architecture. This architecture, first introduced in the i386™ microprocessor, is also the basic architecture of both the i486™ microprocessor and the Pentium™ microprocessor, all available from the Intel corporation of Santa Clara, Calif. The x86 architecture provides for three distinct types of addresses, a logical address, a linear address and a physical address.

The logical address represents an offset from a segment base address. The offset, referred to as the effective address, is based upon the type of addressing mode that the microprocessor is using. These addressing modes provide different combinations of four address elements, a displacement, a base, an index and a scale. The segment base address is accessed via a selector. More specifically, the selector, which is stored in a segment register, is an index which points to a location in a global descriptor table (GDT). The GDT location stores the linear address corresponding to the segment base address.

The translation between logical and linear addresses depends on whether the microprocessor is in Real Mode or Protected Mode. When the microprocessor is in Real Mode, then a segmentation unit shifts the selector left four bits and adds the result to the offset to form the linear address. When the microprocessor is in Protected Mode, then the segmentation unit adds the linear base address pointed to by the selector to the offset to provide the linear address.

The physical address is the address which appears on the address pins of the microprocessor and is used to physically address external memory. The physical address does not necessarily correspond to the linear address. If paging is not enabled then the 32-bit linear address corresponds to the physical address. If paging is enabled, then the linear address must be translated into the physical address. A paging unit performs this translation.

The paging unit uses two levels of tables to translate the linear address into a physical address. The first level table is a Page Directory and the second level table is a Page Table. The Page Directory includes a plurality of page directory entries; each entry includes the address of a Page Table and information about the Page Table. The upper 10 bits of the linear address (A22–A31) are used as an index to select a Page Directory Entry. The Page Table includes a plurality of Page Table entries; each Page Table entry includes a starting address of a page frame, referred to as the real page number of the page frame, and statistical information about the page. Address bits A12–A21 of the linear address are used as an index to select one of the Page Table entries. The starting address of the page frame is concatenated with the lower 12 bits of the linear address to form the physical address.

Because accessing two levels of table for every memory operation substantially affects performance of the microprocessor, the x86 architecture provides a cache of the most recently accessed page table entries, this cache is called a translation lookaside buffer (TLB). The microprocessor only uses the paging unit when an entry is not in the TLB.

The first processor conforming to the x86 architecture which included a cache was the 486 processor, which included an 8 Kbyte unified cache. The Pentium™ processor includes separate 8 Kbyte instruction and data caches. The 486 processor cache and the Pentium™ processor caches are accessed via physical addresses; however, the functional units of these processors operate with logical addresses. Accordingly, when the functional units require access to the cache, the logical address must be converted to a linear address and then to a physical address.

SUMMARY OF THE INVENTION

It has been discovered that by providing a microprocessor with a load section which includes a plurality of reservation station entries which are accessed in parallel, it is possible to perform a plurality of load operations in parallel.

It has also been discovered that by providing a microprocessor with a store section which includes a plurality of store buffer entries which are organized as a first in first out buffer where the outputs from less significant entries of the buffer are provided as inputs to more significant entries of the buffer, it is possible to perform store forwarding operations.

BRIEF DESCRIPTION OF THE DRAWINGS

FIGS. 2A and 2B (generally referred to as FIG. 2) show a block diagram of a load/store functional unit and data cache in accordance with the present invention.

FIGS. 3A and 3B (generally referred to as FIG. 3) show a block diagram of a reservation station circuit of the FIG. 2 load/store functional unit.

FIG. 4 is a block diagram of the contents of an entry in the FIG. 3 reservation station circuit.

FIGS. 10A and 10B (generally referred to as FIG. 10) show a block diagram of a store array and a linear tag array of the FIG. 2 data cache.

DETAILED DESCRIPTION OF THE INVENTION

The following sets forth a detailed description of the best contemplated mode for carrying out the invention. The description is intended to be illustrative of the invention and should not be taken to be limiting.

Figure 1A:
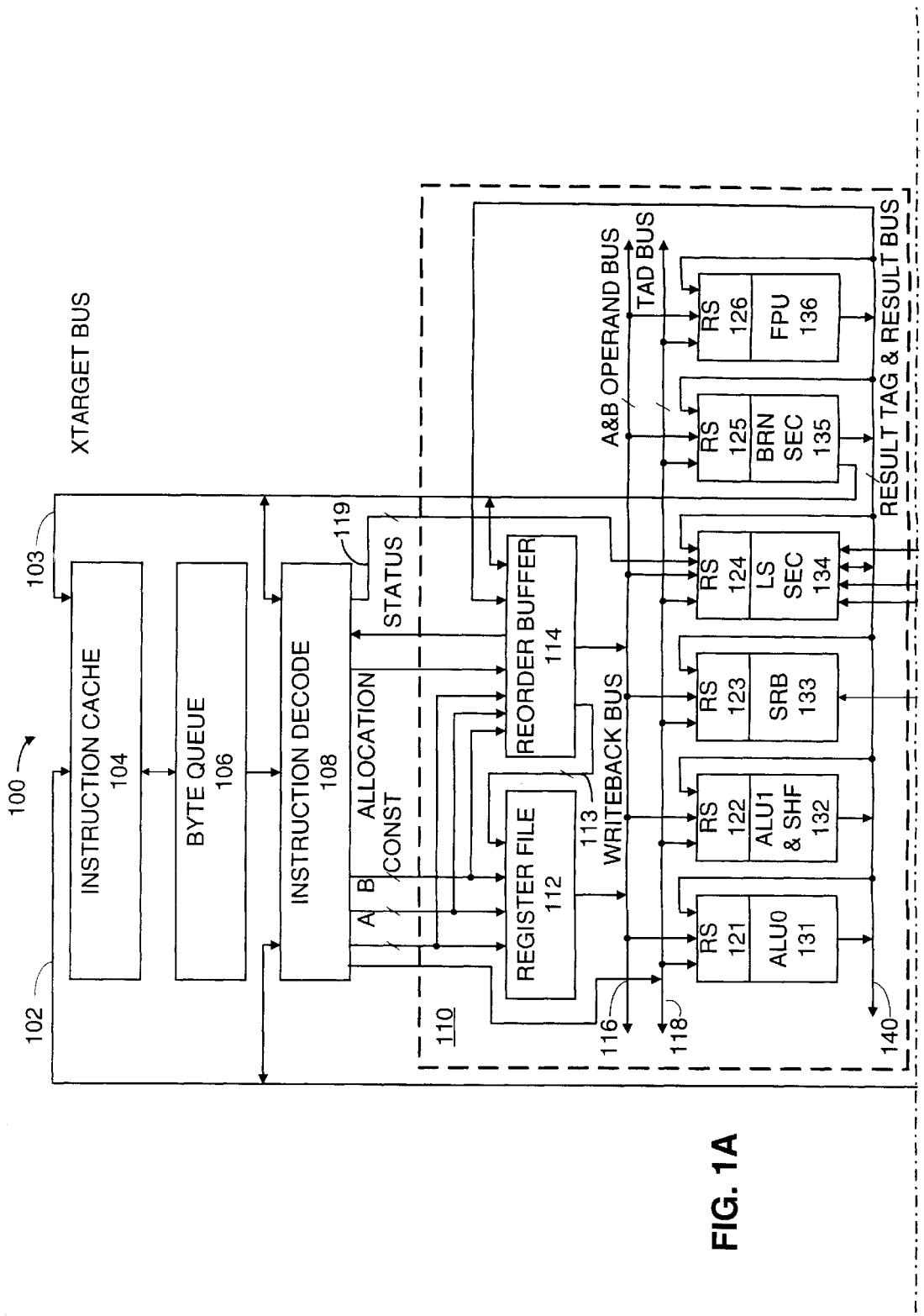
FIGS. 1A and 1B (generally referred to as FIG. 1) show a block diagram of a superscalar microprocessor in accordance with the present invention.
Figures 1, 1A, 1B:
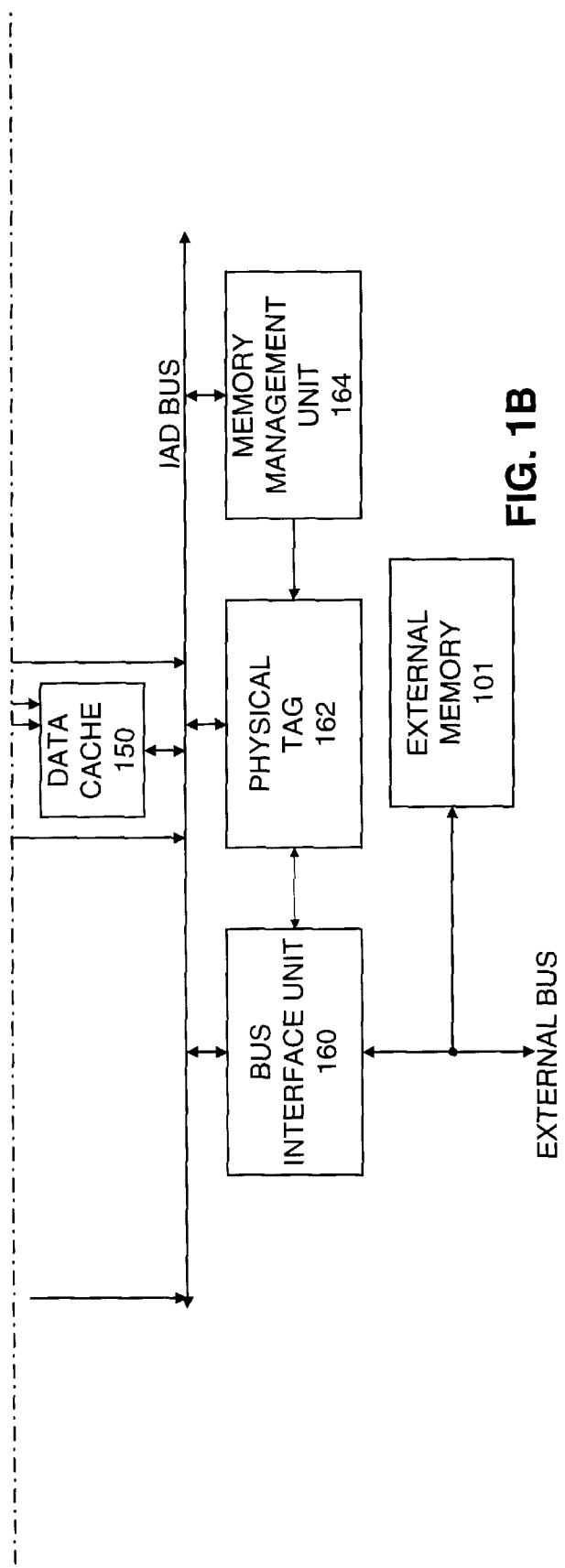

Referring to FIG. 1, the present invention can be best understood in the context of superscalar X86 microprocessor 100 which executes the X86 instruction set. Microprocessor 100 is coupled to physically addressed external memory 101 via a 486 XL bus or other conventional micoprocessor bus. Microprocessor 100 includes instruction cache 104 which is coupled to byte queue 106 which is coupled to instruction decoder 108. Instruction decoder 108 is coupled to RISC core 110. RISC core 110 includes register file 112 and reorder buffer 114 as well as a variety of functional units such as, arithmetic logic units 131, 132 (ALU0 and ALU1 & SHF), special register block 133 (SRB), load/store unit 134 (LSSEC), branch section 135 (BRNSEC), and floating point unit 136 (FPU).

Risc core 110 includes A and B operand buses 116, type and dispatch (TAD) bus 118 and result bus 140 which are coupled to the functional units as well as displacement and instruction, load store (INLS) bus 119 which is coupled between instruction decoder 108 and load/store unit 134. A and B operand buses 116 are also coupled to register file 112 and reorder buffer 114. TAD bus 118 is also coupled to instruction decoder 108. Result bus 140 is also coupled to reorder buffer 114. Additionally, branch section 135 is coupled to reorder buffer 114, instruction decoder 108 and instruction cache 104 via Xtarget bus 103. A and B operand buses 116 includes four parallel 41-bit wide A operand buses and four parallel 41-bit wide B operand buses as well as four parallel 12-bit wide A tag buses, four parallel 12-bit wide B tag buses, a 12-bit wide A tag valid bus a 12-bit wide B tag valid bus, four 4-bit wide destination tag buses and four 8-bit wide opcode buses. Type and dispatch bus 118 includes four 3-bit wide type code buses and one 4-bit wide dispatch buses. Displacement and INLS bus 119 includes two 32-bit wide displacement buses and two 8-bit wide INLS buses.

In addition to instruction cache 104, microprocessor 100 also includes data cache 150 (DCACHE) and physical tag circuit 162. Data cache 150 is coupled to Load/store functional unit 134 of the RISC core and with intraprocessor address and data (IAD) bus 102. Instruction cache 104 is also coupled with IAD bus 102. Physical tag circuit 162 interacts with both instruction cache 104 and data cache 150 via the IAD bus. Instruction cache 104 and data cache 150 are both linearly addressable caches. Instruction cache 104 and data cache 150 are physically separate, however, both caches are organized using the same architecture.

Microprocessor 100 also includes memory management unit (MMU) 164 and bus interface unit 160 (BIU). Memory management unit 164 is coupled with the IAD bus and physical TAG circuit 162. Bus interface unit 160 is coupled to physical translation circuit 162, data cache 150 and IAD bus 102 as well as an external microprocessor bus such as the 486 XL bus.

Microprocessor 100 executes computer programs which include sequences of instructions. Computer programs are typically stored on a hard disk, floppy disk or other non-volatile storage media which are located in the computer system. When the program is run, the program is loaded from the storage media into main memory 101. Once the instructions of the program and associated data are in main memory 101, individual instructions are prepared for execution and ultimately executed by microprocessor 100.

After being stored in main memory 101, the instructions are passed via bus interface unit 160 to instruction cache 104, where the instructions are temporarily held. Instruction decoder 108 retrieves the instructions from instruction cache 104 via byte queue 106, examines the instructions and determines the appropriate action to take. For example, decoder 108 may determine whether a particular instruction is a PUSH, POP, LOAD, STORE, AND, OR, EX OR, ADD, SUB, NOP, JUMP, JUMP on condition (BRANCH) or other instruction. Depending on which particular instruction that decoder 108 determines is present, the instruction is despatched to the appropriate functional unit of RISC core 110. LOADs and STOREs are the primary two instructions which are dispatched to load store section 134. Other instructions which are executed by load/store functional unit 134 include PUSH and POP.

The instructions typically include multiple fields in the following format: OP CODE, OPERAND A, OPERAND B and DESTINATION. For example, the instruction ADD A, B, C means add the contents of register A to the contents of register B and place the result in register C. LOAD and STORE operations use a slightly different format. For example, the instruction LOAD A, B, C means place data retrieved from an address on the result bus, where A, B and C represent address components which are located on the A operand bus, the B operand bus and the displacement bus, these address components are combined to provide a logical address which is combined with a segment base to provide the linear address from which the data is retrieved. Also for example, the instruction STORE A, B, C means store data in a location pointed to by an address, where A is the store data located on the A operand bus and B and C represent address components which are located on the B operand bus and the displacement bus, these address components are combined to form a logical address which is combined with a segment base to provide the linear address to which the data is stored.

The OP CODEs are provided from instruction decoder 108 to the functional units of RISC core 110 via an opcode bus (not shown). Not only must the OP CODE for a particular instruction be provided to the appropriate functional unit, but also the designated OPERANDs for the instruction must be retrieved and sent to the functional unit. If the value of a particular operand has not yet been calculated, then that value must be first calculated and provided to the functional unit before the functional unit can execute the instruction. For example, if a current instruction is dependent on a prior instruction, the result of the prior instruction must be determined before the current instruction can be executed. This situation is referred to as a dependency.

The operands which are needed for a particular instruction to be executed by a functional unit are provided by either register file 112 or reorder buffer 114 to the operand bus. The operand bus conveys the operands to the appropriate functional units. Once a functional unit receives the OP CODE, OPERAND A, and OPERAND B, the functional unit executes the instruction and places the result on a result bus 140, which is coupled to the outputs of all of the functional units and to reorder buffer 114.

Reorder buffer 114 is managed as a first in first out (FIFO) device. When an instruction is decoded by instruction decoder 108, a corresponding entry is allocated in reorder buffer 114. The result value computed by the instruction is then written into the allocated entry when the execution of the instruction is completed. The result value is subsequently written into register file 112 and the instruction retired if there are no exceptions associated with the instruction and if no speculative branch is pending which affects the instruction. If the instruction is not complete when its associated entry reaches the head of the reorder buffer 114, the advancement of reorder buffer 114 is halted until the instruction is completed. Additional entries, however, can continue to be allocated.

Each functional unit includes respective reservation station circuits (RS) 121–126 for storing OP CODEs from instructions which are not yet complete because operands for that instruction are not yet available to the functional unit. Each reservation station circuit stores the instruction's OP CODE together with tags which reserve places for the missing operands that will arrive at the reservation station circuit later. This technique enhances performance by permitting microprocessor 100 to continue executing other instructions while the pending instruction is being assembled with its operands at the reservation station.

Microprocessor 100 affords out of order issue by isolating decoder 108 from the functional units of RISC core 110. More specifically, reorder buffer 114 and the reservation stations of the functional units effectively establish a distributed instruction window. Accordingly, decoder 108 can continue to decode instructions even if the instructions can not be immediately executed. The instruction window acts as a pool of instructions from which the functional units draw as they continue to go forward and execute instructions. The instruction window thus provides microprocessor 100 with a look ahead capability. When dependencies are cleared and as operands become available, more instructions in the window are executed by the functional units and the decoder continues to fill the window with yet more decoded instructions.

Microprocessor 100 uses branch section 135 of the RISC core to enhance its performance. Because when a branch occurs, the next instruction depends upon the result of the branch, branches in the instruction stream of a program hinder the capability of the microprocessor to fetch instructions. Branch section 135 predicts the outcomes of branches which occur during instruction fetching. I.e., branch section 135 predicts whether branches should be taken. For example, a branch target buffer is employed to keep a running history of the outcomes of prior branches. Based on this history, a decision is made during a particular fetched branch to determine which branch the fetched branch instruction will take. If there is an exception or branch misprediction, then the contents of reorder buffer 114 allocated subsequent to the mispredicted branch instruction are discarded.

Figure 2A:
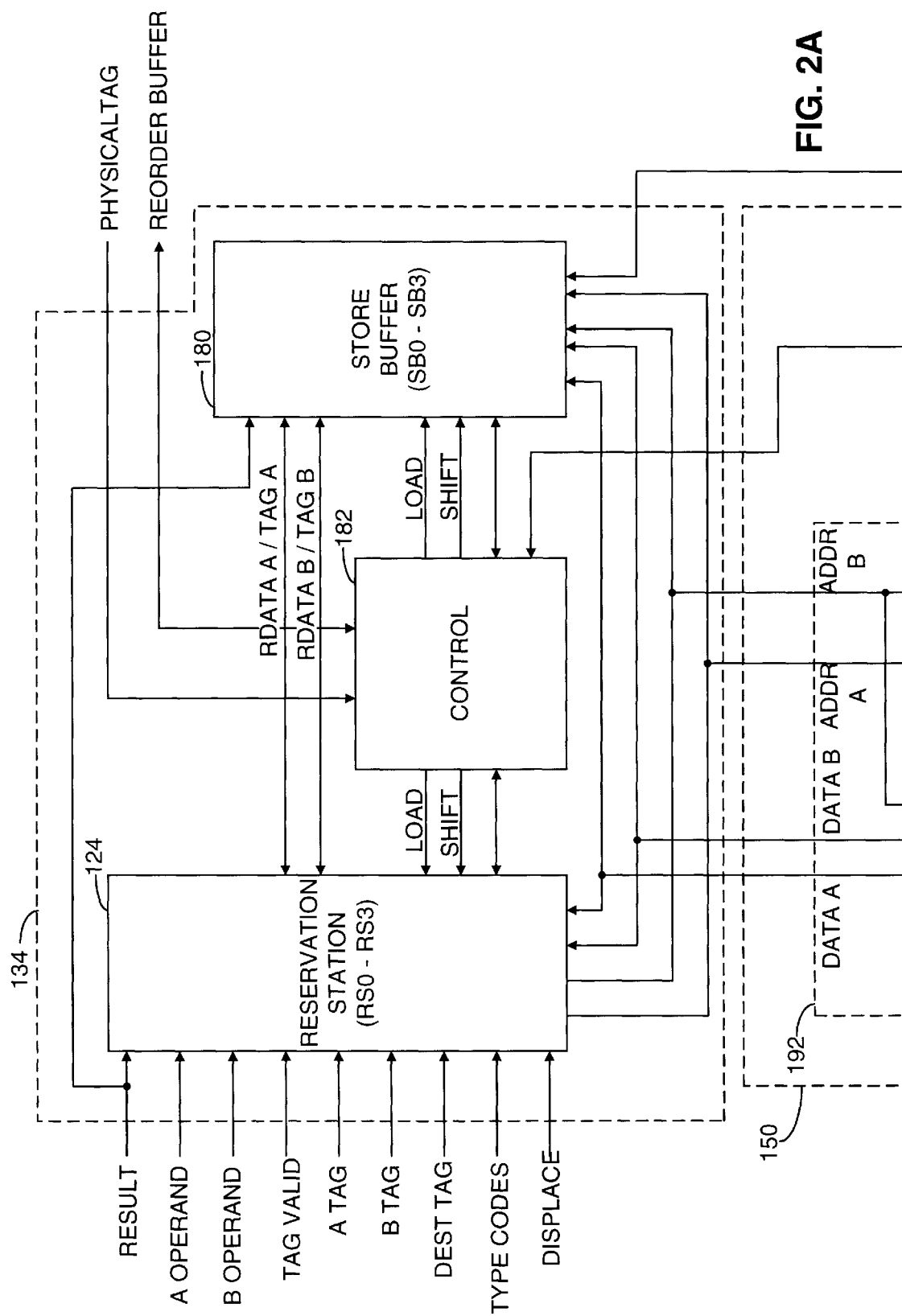

Referring to FIG. 2, load/store functional unit 134 is the functional unit which interacts with data cache 150 and executes all LOAD instructions and all STORE instructions. Load/store functional unit 134 includes reservation station circuit 124, store buffer circuit 180 and load store controller 182. Reservation station circuit 124 includes four reservation station entries (RS0–RS3) and store buffer circuit 180 includes four store buffer entries (SB0–SB3).

Reservation station circuit 124 holds all of the fields which are required to perform a load operation or a store operation. Data elements can be issued to two reservation station entries per clock cycle and can be retired from two reservation station entries per clock cycle. Reservation station circuit 124 is coupled to the four result buses, 40 bits of the four 41-bit A operand buses, 32 bits of the four B 41-bit operand buses, the A and B tag valid buses, the four A tag buses, the four B tag buses, the four destination tag buses, the four type code buses, the two displacement buses and the two INLS buses as well as to the 32-bit data portions of ports A and B of data cache 150. Reservation station circuit 124 is coupled to store buffer circuit 180 via a 40-bit A operand bus, a 32-bit reservation station data bus (RDATA A, RDATA B, respectively), a 12-bit A tag bus (TAG A) and a 12-bit B tag bus (TAG B) as well as two 32-bit address buses (ADDR A, ADDR B); the two address buses are also coupled to the address portions of ports A and B of data cache 150. Reservation station 124 is coupled to controller 182 via a reservation station load bus and a reservation station shift bus.

In addition to being coupled to reservation station circuit 124, store buffer circuit 180 is coupled with the four result buses and is also coupled with load store controller 182 via store buffer load bus and store buffer shift bus. Store buffer circuit 180 is also coupled to IAD bus 102.

In addition to being coupled to reservation station circuit 124 and store buffer circuit 180, load store controller 182 is coupled to physical tag circuit 162 and reorder buffer 114. Controller 182 is also coupled to cache controller 190 of data cache 150.

Data cache 150 is a linearly addressed 4-way interleaved, 8 Kbyte 4-way set associative cache which supports two accesses per clock cycle, i.e., data cache 150 supports dual execution. Each set of data cache 150 includes 128 entries; each entry includes a sixteen byte block of information. Each sixteen byte block of information is stored in a line of four individually addressable 32-bit banks. By providing data cache 150 with individually addressable banks, data cache 150 functions as a dually accessible data cache without requiring the overhead associated with providing dual porting. Data cache 150 is dually accessible via data cache port A and data cache port B thus allowing data cache 150 to perform two load operations simultaneously. Data cache port A includes a data portion, DATA A, and an address portion, ADDR A; data cache port B includes a data portion, DATA B, and an address portion, ADDR B.

Data cache 150 includes data cache controller 190 and data cache array 192. Data cache controller 190 provides control signals to orchestrate the various operations of data cache 150. Data cache array 192 stores data under the control of data cache controller 190. Data cache array 192 is organized into two arrays, data store array 200 and linear tag and status array 202. Data store array 200 provides two data signals, DATA A, DATA B, to load/store functional unit 134. Linear tag array 202 receives two linear addresses, ADDR A, ADDR B, which are provided by load/store functional unit 134 and provides two 4-bit tag hit signals, COL HITA 0–3, COL HIT B 0–3, to store array 200. Linear addresses ADDR A and ADDR B are also provided to data store array 200.

During a load operation, reservation station circuit 124 of load store functional unit 134 provides an address to data cache 150; if this address generates a cache hit, then data cache 150 provides the data which is stored in the corresponding bank and block of store array 200 to reservation station circuit 124. If the address was provided to data cache 150 via port A, then the data is provided to reservation station circuit 124 via port A; alternately, if the address was provided to data cache 150 via port B, then the data is provided to reservation station circuit 124 via port B. Addresses are provided to data cache 150 and data is received from data cache 150 via port A and port B simultaneously.

During a store operation, the store data is provided from reservation station circuit 124 to store buffer circuit 180. When the store operation is released, the data, and corresponding address, which is being stored is provided via IAD bus 102 to data cache 150.

Figure 3A:
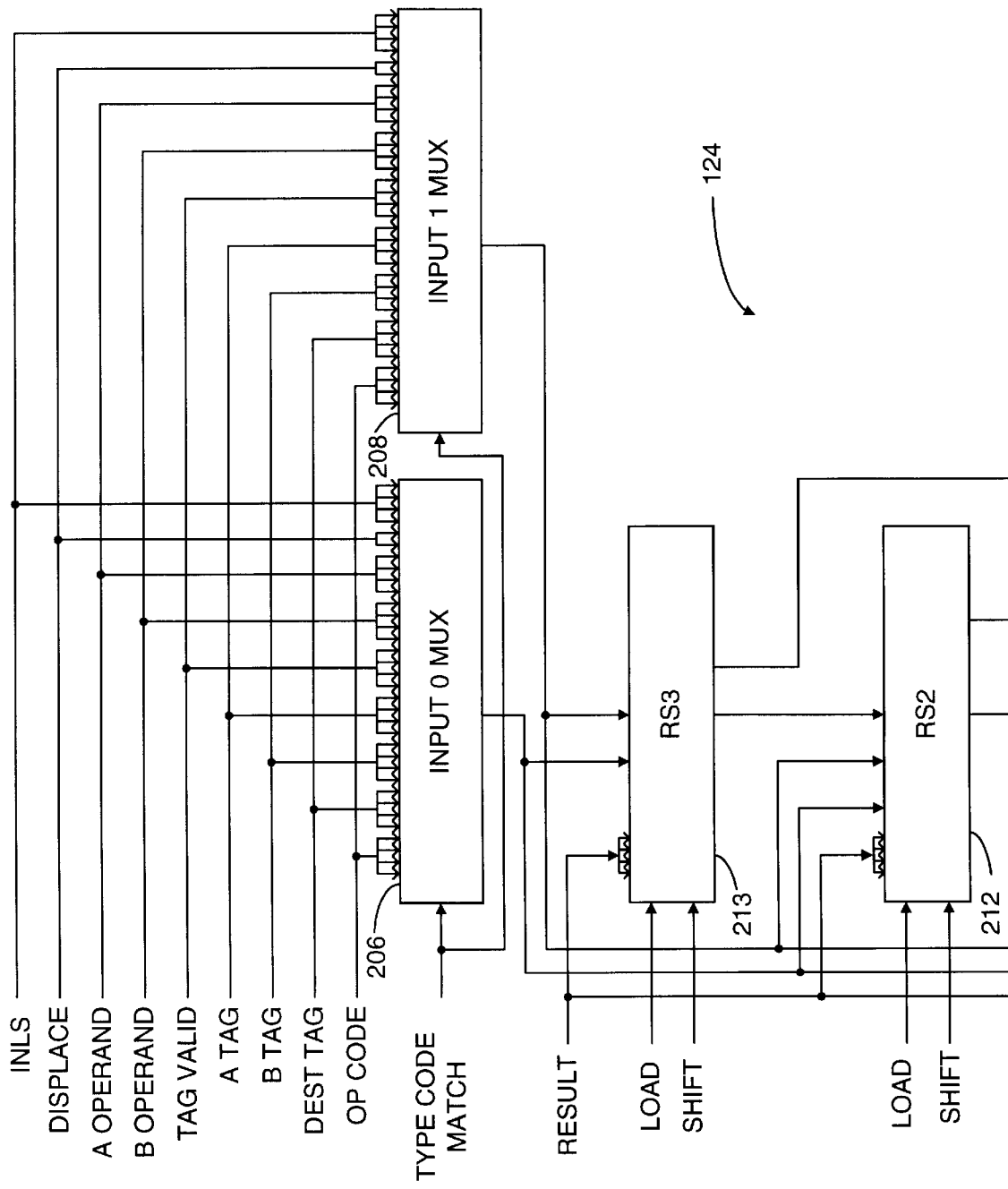

Referring to FIG. 3, reservation station circuit 124 is a dual access reservation station which functions as a first in first out (FIFO) buffer. Reservation station circuit 124 includes input 0 multiplexer circuit 206, input 1 multiplexer circuit 208 and four reservation station entries RS0 210, RS1 211, RS2 212 and RS3 213 as well as reservation station 0 adder circuit 216, reservation station 1 adder circuit 218 and reservation station driver circuit 220.

Multiplexer circuits 206, 208 receive as inputs the four A operand buses, the four B operand buses, the A and B tag valid buses, the four A tag buses, the four B tag buses, the four destination tag buses, the four opcode buses, the two INLS buses and the two displacement buses. Multiplexer circuits 206, 208 also receive bus select signals from load store controller 182. The bus select signals are generated based upon type code matches.

A type code match occurs when a type code on one of the four type code buses corresponds to the type code assigned to the load store functional unit. When a type code matches, load store controller 182 generates a bus select signal indicating from which bus information should be retrieved. Reservation station circuit 124 can retrieve signals from two buses simultaneously. Accordingly, first and second sets of bus select signals are generated by load store controller 182 for input 0 multiplexer 206 and input 1 multiplexer 208, respectively.

Under control of the first set of bus select signals, multiplexer circuit 206 provides a first multiplexed reservation station input signal (INPUT 0) which is provided as an input signal to the reservation stations. The INPUT 0 signal includes a signal from one of the A operand buses, a signal from one of the B operand buses, a tag from one of the A tag buses, tag valid bits corresponding to the A tag from the corresponding tag valid bus, a tag from one of the B tag buses, tag valid bits corresponding to the B tag from the corresponding tag valid bus, a destination tag from one of the destination tag buses, an opcode from one of the opcode buses and a displacement from one of the displacement buses. Under control of the second set of bus select signals, multiplexer circuit 208 provides a second multiplexed reservation station signal (INPUT 1) which is provided as a second input signal to the reservation stations. The INPUT 1 signal includes a signal from one of the A operand buses, a signal from one of the B operand buses, a tag from one of the A tag buses, tag valid bits corresponding to the A tag from the corresponding tag valid bus, a tag from one of the B tag buses, tag valid bits corresponding to the B tag from the corresponding tag valid bus, a destination tag from one of the destination tag buses, an opcode from one of the opcode buses and a displacement from one of the displacement buses.

Reservation station entries 210–213 each receive the two input signals, INPUT 0, INPUT 1, in parallel as well as respective load and shift bits. Reservation station entries 210–213 also receive inputs from each of the four result buses; these result bus inputs are provided to the A and B operand portions of the entry only. Information is retrieved from these result buses based upon the A operand tag and the B operand tag. For example, when an A operand tag provides a hit to information that is on one of the destination tag buses, then information from the corresponding result bus is retrieved and loaded into the A operand field of the reservation station entry.

Additionally, reservation station entry RS0 receives a reservation station entry from either reservation station RS1 and RS2; reservation station entry RS0 provides a portion of the RS0 reservation station entry (the A operand portion) to store buffer circuit 180 as the RDATA A signal and provides the entire RS0 reservation station entry to R0 adder 216. R0 adder 216 uses this reservation station entry to generate the ADDR A signal. Reservation station entry RS1 receives a reservation station entry from reservation stations RS2 and RS3; reservation station entry RS1 provides a portion of the RS1 reservation station entry (the A operand portion) to store buffer circuit 180 as the RDATA B signal and provides the entire RS1 reservation station entry to R1 adder 218. R1 adder 218 uses this reservation station entry to generate the ADDR B signal. Reservation station RS2 receives a reservation station entry from reservation station RS3; reservation station entry RS2 provides the RS2 reservation station entry to reservation stations RS1 and RS0. Reservation station RS3 provides the RS3 reservation station entry to reservation stations RS2 and RS1.

By providing the parallel inputs and outputs from the reservation stations as well as the parallel forwarding structure, reservation station circuit 124 may execute either one or two load operations per cycle. More specifically, using the load and shift signals, controller 182 controls the loading and shifting of reservation station entries so that either one or two reservation station entries may be loaded or shifted in any given cycle.

When one reservation station entry is being executed per cycle, then reservation station RS0 provides a reservation station entry to RS0 adder circuit 216 for both load and store operations; additionally, for a store operation RS0 provides the reservation station entry to store buffer 180. Reservation station RS1 provides a reservation station entry to reservation station RS0, reservation station RS2 provides a reservation station entry to reservation station RS1 and reservation station RS3 provides a reservation station entry to reservation station RS2. For a load operation, the data corresponding to the address generated by RS0 adder circuit 216 is provided to driver circuit 220.

When two reservation station entries are being executed per cycle, then reservation stations RS0 and RS1 provide respective reservation station entries to adder circuits 216, 218 for both load and store operations. Reservation stations RS2 and RS3 provide reservation station entries to reservation stations RS0 and RS1, respectively. For load operations, the data corresponding to the addresses generated by the RS0 and RS1 adder circuits are provided as DATA A and DATA B from data cache 150. When two reservation station entries are being executed per cycle, and one operation is a load and the other operation is a store, then the reservation station entry from which the store operation is being performed is provided to store buffer 180.

If a load produces a cache miss, then a load miss algorithm must be executed. Since this load operation is speculative, the miss operation is not initiated until the load is the next ROP to retire. Because of this, the load holds in the RS0 reservation station and waits for the release signal from the reorder buffer. A status indication along with the destination tag is driven back to the reorder buffer to indicate this condition.

Referring to FIG. 4. each reservation station entry 124 includes a reservation station entry valid bit (v), a 40-bit A operand field, a 32-bit B operand field, a 32-bit displacement field, a 4-bit destination tag (DTAG) field, an 8-bit opcode field and an 8-bit additional opcode information (INLS) field. Additionally, each reservation station entry also includes a 4-bit A operand upper byte tag (ATAGU), a 4-bit A operand middle byte tag (ATAGM) and a 4-bit A operand lower byte tag (ATAGL), a 4-bit B operand upper byte tag (BTAGU), an 4-bit B operand middle byte tag (BTAGM) and an 4-bit B operand lower byte tag (BTAGL) along with the corresponding A and B operand tag valid bits. Each reservation station entry also includes a corresponding cancel bit (C).

The A operand upper, middle and lower byte tags are tags for upper, middle and lower portions of an integer operand. The integer operand is divided this way because, under the x86 architecture, it is possible to reference either the upper or lower byte of the lower half-word, the lower half-word or the entire 32-bit double word of an x86 integer. Accordingly, the M and L refer to the upper and lower byte of the lower half word and the U refers to the upper half-word for a B operand and to the remaining upper bits for an A operand (because the remaining portion of the A operand may be either 16-bits or 24-bits). When referencing the lower half word, the L and M tags are set to the same value. All three tags are set to the same value when referencing a 32-bit value which is pending in the reservation station entry.

The cancel bit indicates that a particular opcode should be cancelled; this bit is set when any opcode is within a mispredicted branch. The opcode is cancelled in order to prevent cancelled stores that hit in data cache 150 from entering store buffer circuit 180 as stores that are executed update the state of an entry which is stored in data cache 150. Loads that are cancelled just return the results when there is a hit in data cache 150 and thus are not problematic as a load does not update any state.

The reservation station entry valid bit of the reservation station entry is coupled to the dispatch valid bit portion of the INPUT 0 and INPUT 1 input signals. Each input signal valid bit, which is coupled to the dispatch bus, is set when the dispatch valid bit is set. The A operand field of the reservation station entry is coupled to the A operand portion of the INPUT 0 and INPUT 1 input signals. The B operand field of the reservation station entry is coupled to the B operand portion of the INPUT 0 and INPUT 1 input signals. The displacement field of the reservation station entry is coupled to the displacement portion of the INPUT 0 and INPUT 1 input signals. The destination tag field of the reservation station entry is coupled to the destination tag portion of the INPUT 0 and INPUT 1 input signals. The opcode field of the reservation station entry is coupled to the opcode portion of the INPUT 0 and INPUT 1 input signals. The additional opcode information (INLS) field of the reservation station entry is coupled to the INLS portion of the INPUT 0 and INPUT 1 input signals via the INLS buses.

The A operand upper byte tag, middle byte tag, and lower byte tag of the reservation station entry are coupled to the A tag portion of INPUT 0 and INPUT 1 input signals. The B operand upper byte tag, middle byte tag and lower byte tag are coupled to the B tag portion of the INPUT 0 and INPUT 1 input signals. The A and B operand tag valid bits of the reservation station entry are coupled to the tag valid portion of the INPUT 0 and INPUT 1 input signals. The cancel bit of the reservation station entry is coupled to load store controller 182, and is set based upon control information which is received from reorder buffer 114 and branch section 135.

The type match signals which are generated by load store controller 182 determine whether any instructions have been dispatched to the load store functional unit. More specifically, when load store controller 182 determines that the load store functional unit type code matches a type code that is provided on one of the four TAD buses, then load store controller 182 selects that particular dispatch position for the INPUT 0 signal. When load store controller 182 determines that the load store functional unit type code matches a type code that is provided by another one of the four TAD buses, then load store controller 182 selects that particular dispatch position for the INPUT 1 signal.

Figure 5:
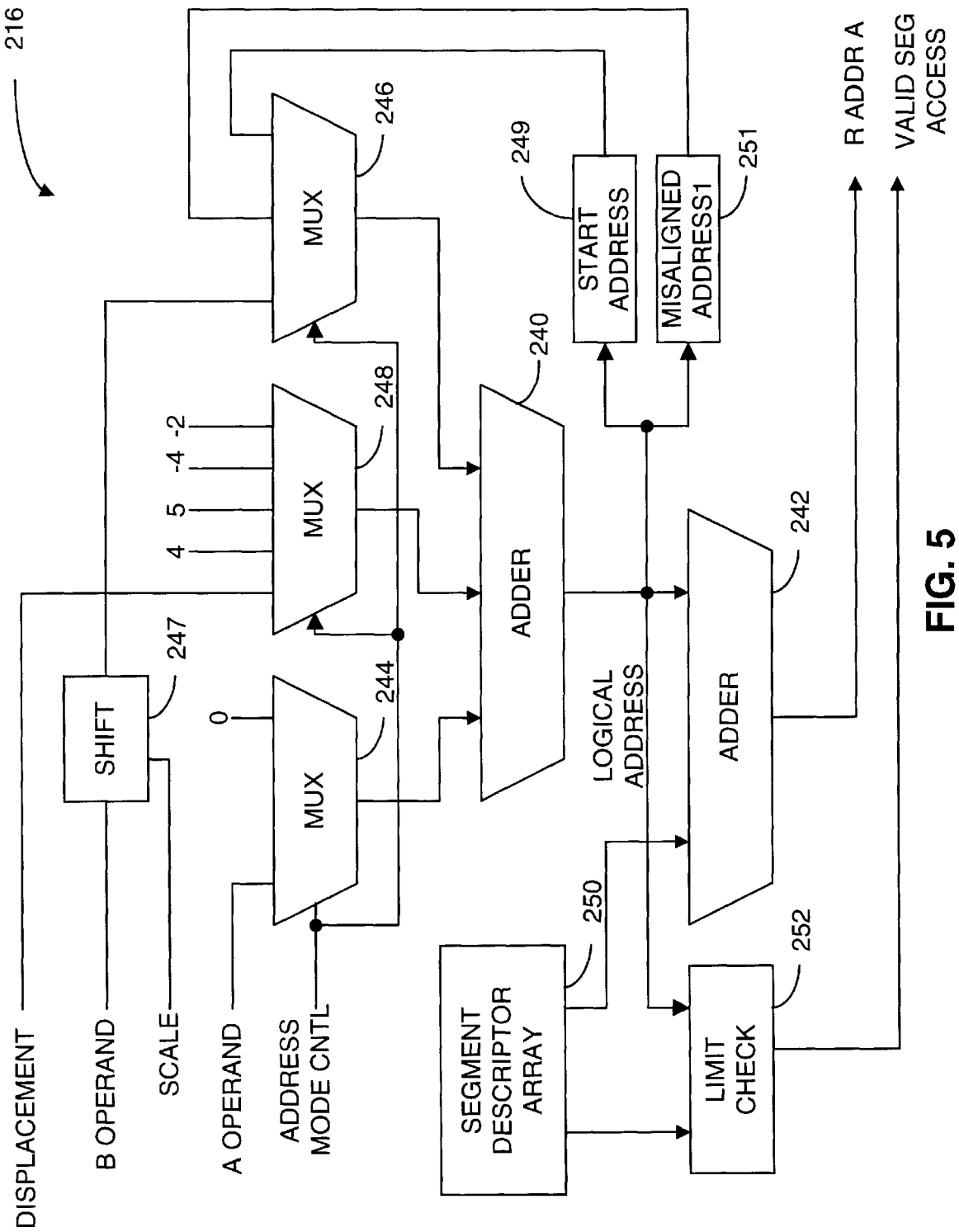
FIG. 5 is a block diagram of an adder circuit of the FIG. 3 reservation station circuit.

Referring to FIG. 5, RS0 adder circuit 216 receives address components from reservation station 210 and provides the linear address signal ADDR A as well as a valid segment access signal. RS0 adder circuit 216 includes logical address adder 240 and linear address adder 242. Logical address adder 240 provides a logical address to linear address adder 242. Logical address adder 240 receives an A operand adder signal from A operand multiplexer 244, a B operand adder signal from B operand multiplexer 246 and a displacement adder signal from displacement multiplexer 248.

A operand multiplexer circuit 244 receives the A operand from reservation station entry 210, as well as a quantity zero; the value which is multiplexed and provided as the A operand adder signal is determined by the address mode control information which is received from load store controller 182. B operand multiplexer circuit 246 receives a scaled B operand from shift circuit 247. The B operand is scaled based upon the scale signal which is received from instruction decoder 108 via the INLS buses. B operand multiplexer circuit 246 also receives a start address which is stored in start address register 249 under control of load store controller 182 and the misaligned access 1 address which is stored in misaligned access register 251 from a prior misaligned access; the value which is multiplexed and provided as the B operand adder signal is determined by the address mode control information. Displacement multiplexer circuit 248 receives the displacement address component from reservation station entry 210. Displacement multiplexer circuit 248 also receives the quantities four, five, minus four and minus two; the value which is multiplexed and provided as the displacement adder signal is determined by the address mode control information.

For an aligned access load operation, the A operand is selected by multiplexer 244, the B operand is selected by multiplexer 246 and the displacement is selected by 248. For a misaligned access load operation, i.e., any access which crosses a doubleword boundary, the first misaligned access address is generated as a normal load operation and adder 240 generates a misaligned access 1 address. Misaligned access 1 register 251 holds this misaligned access 1 address. In the next clock cycle, the value 0 is selected by A operand multiplexer 244, the value 4 is selected by B operand multiplexer 246, and the misaligned access 1 address is selected by multiplexer 248, thus causing add 240 to adder the quantity 4 to the misaligned access 1 address. For a multiple ROP operation, e.g., a 64-bit load operation, the first access address is generated as a normal load operation and adder 240 generates a multiple ROP start address. Start address register 249 holds this start address. When the second ROP is accessed, the second ROP address is formed by adding the start address from multiplexer 248 and the value 4 from multiplexer 246. For an 80-bit multiple ROP operation, the value 5 is provided by multiplexer 246. Each multiple ROP operation can be misaligned; in this instance, the start address is functionally the same as the misaligned access address 1. For a PUSH operation, a value is subtracted from the B operand address depending on the access size of the operation. If the access size is a doubleword, then the value 4 is subtracted; if the access size is a word then the value 2 is subtracted. The scaling factor, which controls shift circuit 247, is generated by load store controller 182 based upon the INLS information.

Adder circuit 216 also includes segment descriptor array 250 and limit check circuit 252. Segment descriptor array 250 provides a segment limit signal to limit check circuit 252 and a segment base address signal to adder circuit 242. Limit check circuit 252 also receives the logical address from logical adder 240 and provides a valid segment access signal indicating that the logical address is within the segment limits as set forth by the limit provided by segment descriptor array 250.

Adder circuit 240 receives the A operand adder signal, the B operand adder signal and the displacement adder signal and adds these signals to provide a logical address signal. Adder circuit 242 adds the segment base address, which is received from segment descriptor array 250, to the logical address to provide the linear address.

RS1 adder 218 is similar to RS0 adder with the exception that RS1 adder 218 does not include multiplexer 248 because unaligned accesses are only performed using the RS0 reservation station. In RS1 adder 218, the displacement is provided directly to adder 240 as the displacement adder signal. Additionally, because unaligned accesses are not performed, multiplexer 246 for RS1 adder 218 is not provided with the values 4 and 5.

Figure 6A:
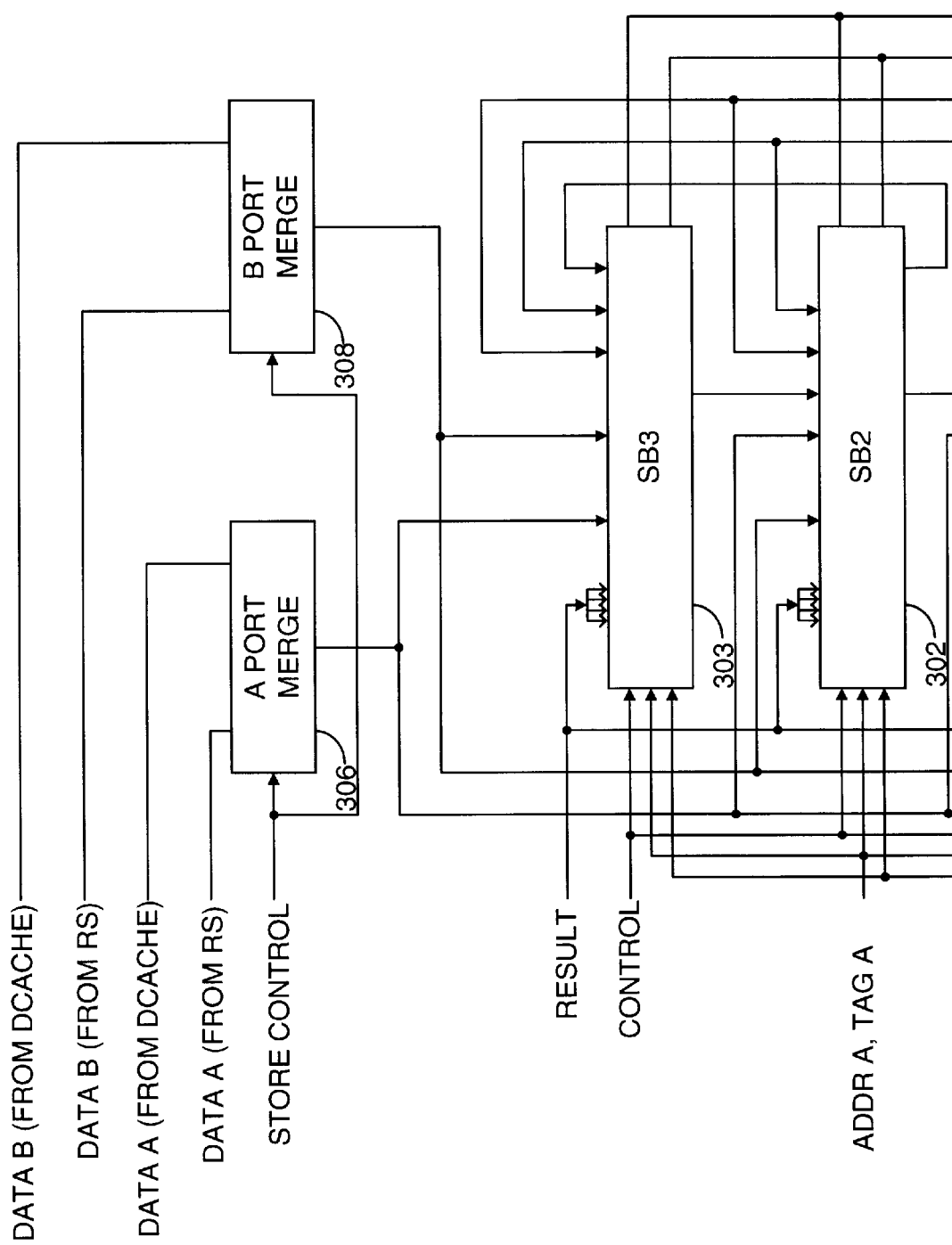
FIGS. 6A and 6B (generally referred to as FIG. 6) show a block diagram of a store buffer circuit of the FIG. 2 load/store functional unit.
Figure 6B:
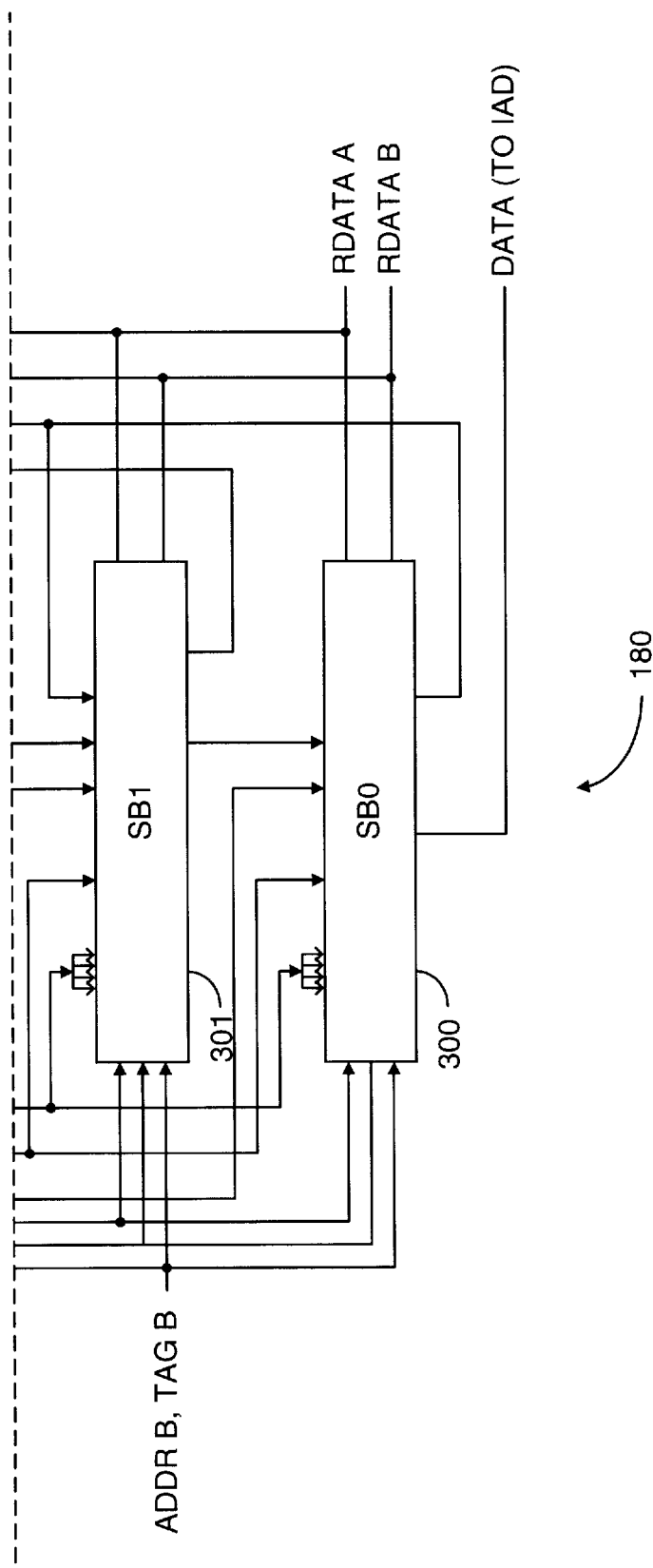

Referring to FIG. 6, store buffer includes four store buffer entries SB0 300, SB1 301, SB2 302, and SB3 303 as well as A port merge circuit 306 and B port merge circuit 308. A port merge circuit 306 receives the A port data signal from data cache 150 and the A port data signal from reservation station entry RS0 of reservation station circuit 124 and merges these signals to provide a merged A data signal to store buffer entries SB0–SB3. B port merge circuit 308 receives the B port data signal from data cache 150 and the B port data signal from reservation station entry RS1 of reservation station circuit 124 and merges these signals to provide a merged B data signal to store buffer entries SB0–SB3. By providing merge circuits 306, 308, a steering function is provided.

For example, one byte of the four byte DATA A signal may have been updated when provided by reservation station circuit 124. This updated byte is then merged with the three remaining bytes from the DATA A signal which is provided by data cache 150. Merge circuits 306, 308 are controlled by load store controller 182 based upon the access size, least significant two bits of the linear address and whether an access is a misaligned access 1 or a misaligned access 2. The steering function which is provided by merge circuits 306, 308 is possible because stores are done as read modify write operations. By providing this steering function, data cache 150 does not require complex steering circuitry because all accesses to data cache 150 are 32-bit double word accesses. Additionally, whatever information is in a store buffer entry is a reflection of what will be stored in data cache 150, thus allowing load store functional unit 134 to provide a load forwarding operation. In a load forwarding operation, loads may be performed before stores are actually stored in data cache 150 by accessing the store buffer entries; load forwarding removes store operations from the microprocessor's critical timing path.

Each store buffer entry also receives input signals from the four result buses, the ADDR A and ADDR B address signals from reservation station 124 and the TAG A and TAG B tag signals from reservation station 124 as well as control signals from load store controller 182. These control signals include the load signals and the shift signals. Additionally, store buffer entry SB0 receives an output from store buffer entry SB1 and provides a store output to IAD bus 102. Store buffer entry SB1 receives a store buffer entry output from store buffer entry SB2 and also receives a store buffer entry output from store buffer entry SB0 and provides a store buffer entry output to SB0. Store buffer entry SB2 receives a store buffer entry output from store buffer entry SB3 and also receives an entry from store buffer entries SB0 and SB1, and provides a store buffer entry output to SB1. Store buffer SB3 receives a store buffer entry output from store buffer entries SB0, SB1 and SB2 and provides a store buffer entry output to SB2.

By providing store buffer entries SB1–SB3 with the feed back from less significant store buffer entries, a store forwarding operation is possible. For example, the store buffer entry SB0 is provided to more significant store buffer entries SB1–SB3 to allow these store buffer entries to combine the SB0 store buffer entry with the more significant entries when the entries have the same linear address. Accordingly, when the store buffer entry it stored, is includes all modifications to the entry. The store forwarding function is discussed in more detail below.

Store forwarding allows the system to operate without having to stall a reservation station until a previous store is stored in data cache 150. Because, in the x86 architecture, a significant number of consecutive byte accesses occur, store forwarding significantly increases the speed with which loads are performed by removing the dependency of a load operation on a store operation.

Figure 7:
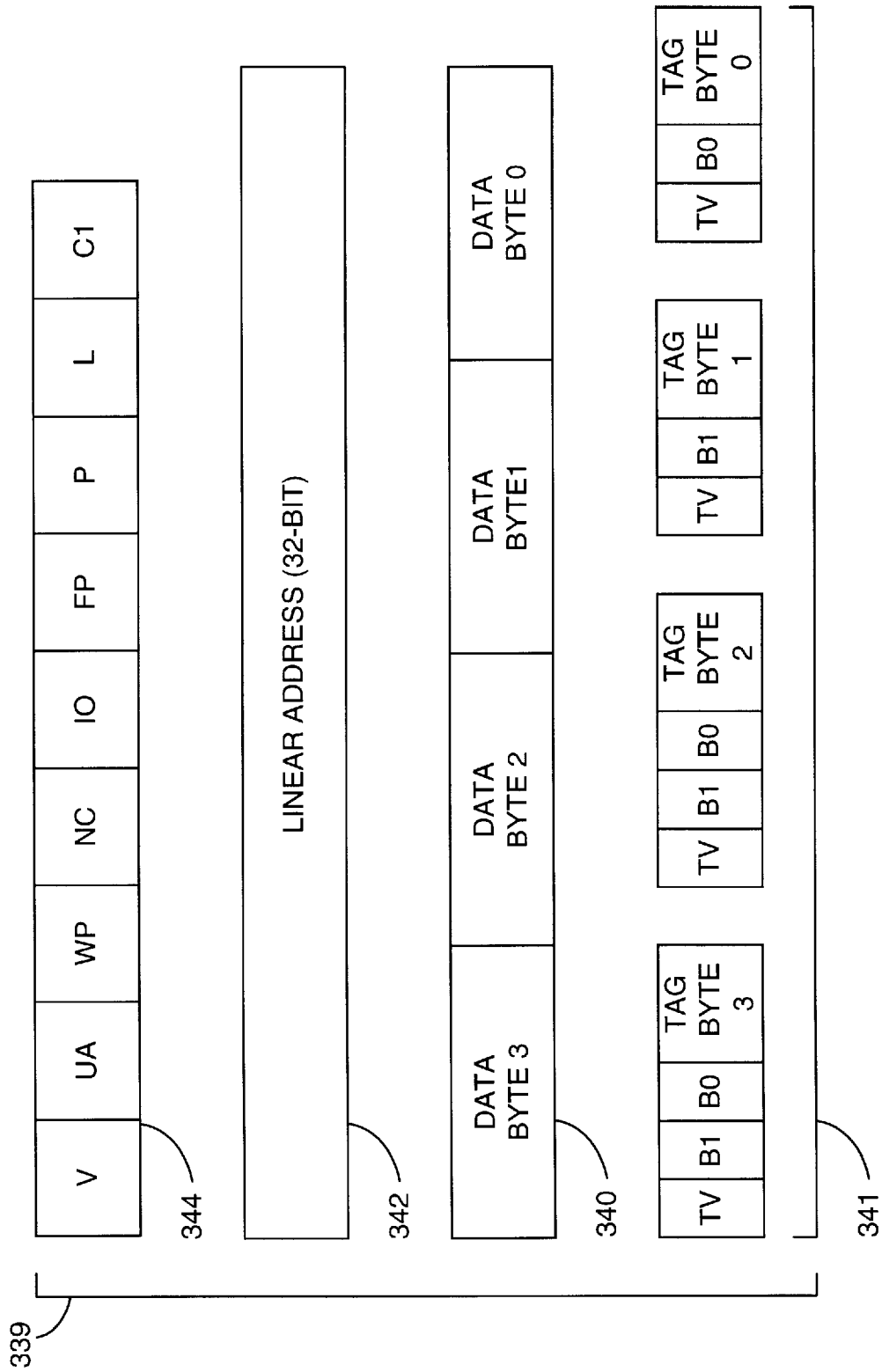
FIG. 7 is a block diagram of the contents of an entry of the FIG. 6 store buffer circuit.

Referring to FIG. 7, each store buffer entry SB0–SB3 of store buffer circuit 180 includes the information set forth in store buffer entry 339. Store buffer entry 339 includes 32-bit data double word 340, tag portion 341, 32-bit linear address 342 and control information portion 344. Data double word 340 includes four data bytes, data byte 0–data byte 3.

Tag portion 341 includes four byte tag portions which correspond to data bytes 0–3. Byte 0 tag portion includes a byte 0 tag (TAG BYTE 0), a byte 0 control bit (B0) and a byte 0 tag valid bit (TV). Byte 1 tag portion includes a byte 1 tag (TAG BYTE 1), a byte 1 control bit (B1) and a byte 1 tag valid bit (TV). Byte 2 tag portion includes a byte 2 tag (TAG BYTE 2), byte 2 control bits (B0, B1) and a byte 2 tag valid bit (TV). Byte 3 tag portion includes a byte 3 tag (TAG BYTE 3), byte 3 control bits (B0, B1) and a byte 3 tag valid bit (TV).

The byte tags TAG BYTE 0–3 provide tags to retrieve data bytes 0–3 from result buses. The byte control bits indicate from which result bus byte a data byte should be retrieved. More specifically, when byte 0 control bit B0 is set, it indicates that data should be forwarded from a result bus byte 1; if byte 0 control bit B0 is cleared then data should be forwarded from a result bus byte 0. When byte 1 control bit B1 is set, it indicates that data should be forwarded from a result bus byte 0; if byte 1 control bit B1 is cleared, then data should be forwarded from a result bus byte 1. When byte 2 control bit B1 is set, it indicates that data should be forwarded from a result bus byte 1 and when byte 2 control bit B0 is set, it indicates that data should be forwarded from a result bus byte 0; if byte 2 control bits B0 and B1 are cleared then data should be forwarded from a result bus byte 2. When byte 3 control bit B1 is set, it indicates that data should be forwarded from a result bus byte 1 and when byte 3 control bit B0 is set, it indicates that data should be forwarded from a result bus byte 0; if byte 3 control bits B0 and B1 are cleared then data should be forwarded from a result bus byte 3. The byte tag valid bits TV indicate that the corresponding tag field contains a valid byte tag.

The store buffer tags indicate the actual byte locations in memory whereas with the reservation station tags, there is not a one to one correspondence between tag and location. With the reservation station tags, the L and M tags can map to any locations within the store buffer tags. Unaligned accesses with valid tags are not allowed into the store buffer. For unaligned access stores, reservation station entries RS0 and RS1 wait until valid data is received by the reservation station and then the data is provided as two store buffer entries to the store buffer.

Control portion 344 includes a store buffer entry valid bit (V), a 2-bit unaligned access control signal (UA), a write protect bit (WP), a non-cachable store bit (NC), an Input/ Output access bit (IO), a floating point update pointer bit (FP), a physical access bit (P), a locked access bit (L), and a 2-bit column indication signal (C1). The store buffer entry valid bit indicates that the particular entry is valid, i.e., that there is some valid information stored in this store buffer entry. The unaligned access control signal indicates which portion, i.e., the first portion or the second portion, of an unaligned access is stored in the entry. The non-cachable store bit indicates that the store entry is not cachable and accordingly that the entry should not be written into data cache 150. The I/O access bit indicates to the external interface that an I/O access is occurring. The physical access bit indicates that the memory management unit should bypass the linear to physical translation because the store address is a physical address; this occurs when the load store functional unit is updating either the page directory or the TLB of memory management unit 164. The locked access bit indicates to unlock the external bus which may have been locked by a previous load. The column indication signal indicates one of four columns in the data cache that is being written; accordingly, there is no need to perform a column lookup in data cache 150 when performing a store operation.

Figure 8A:
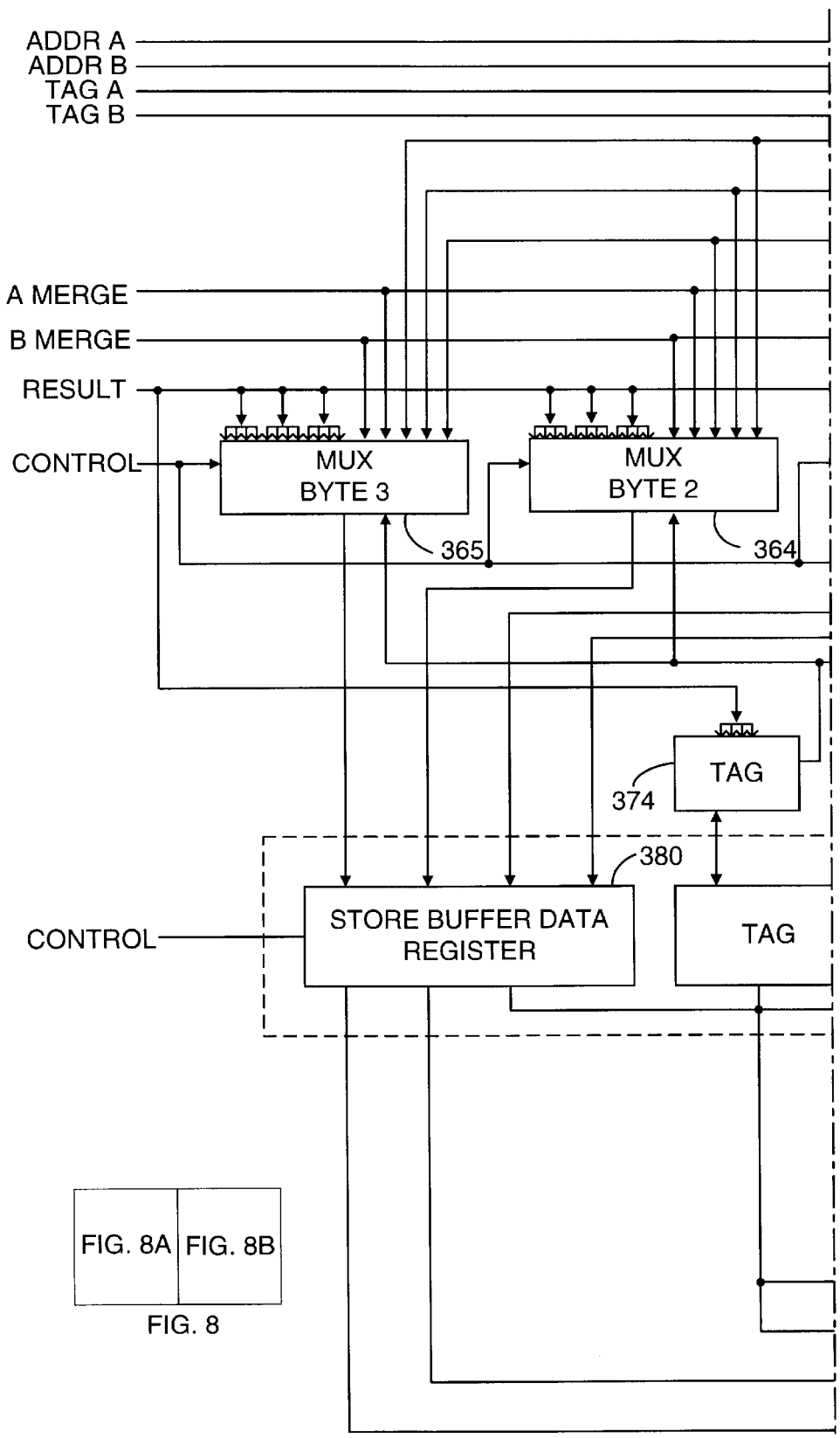
FIGS. 8A and 8B (generally referred to as FIG. 8) show a block diagram of a store buffer entry of the FIG. 6 store buffer circuit.
Figure 8B:
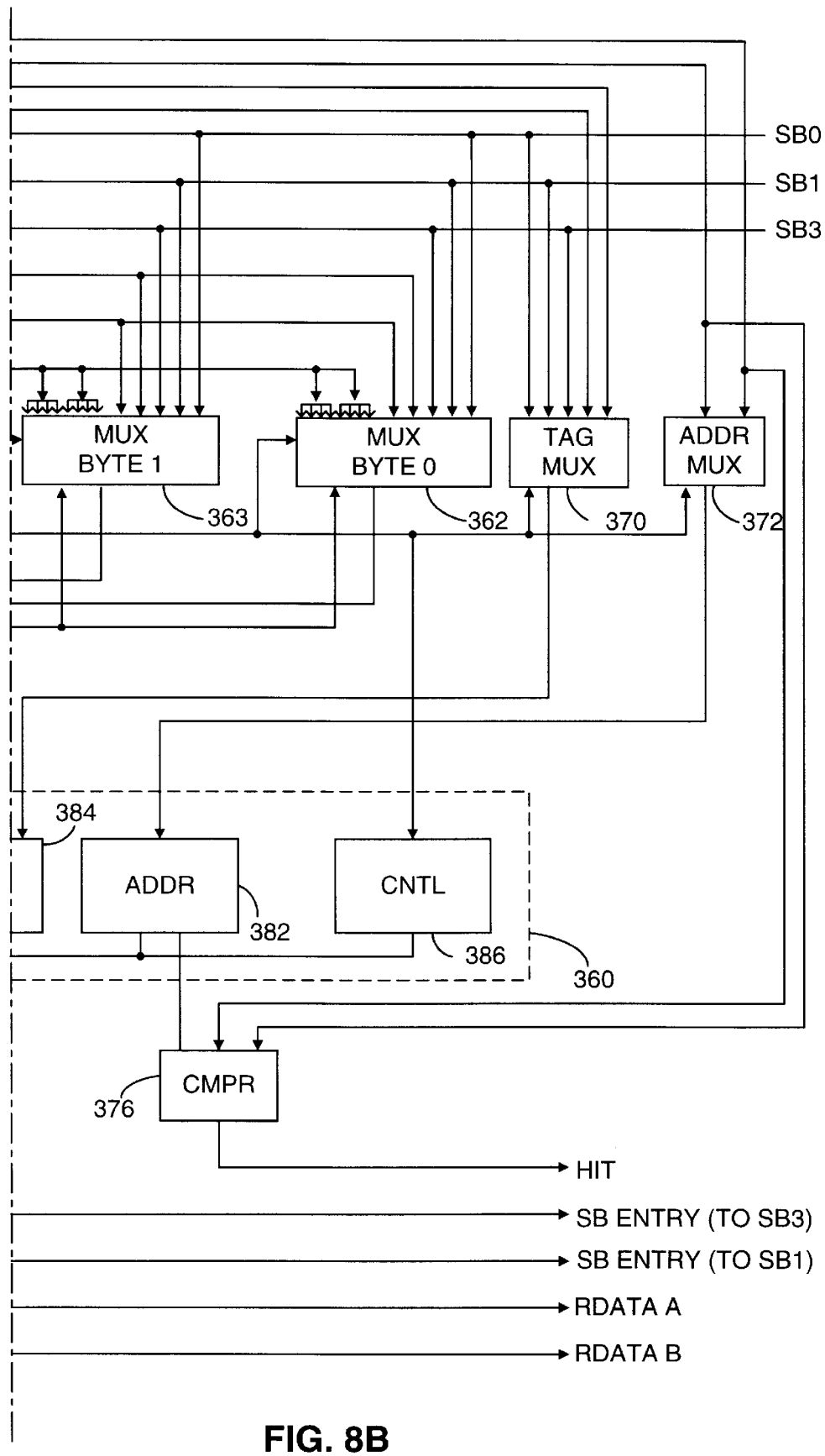

Referring to FIG. 8, store buffer entry circuit SB2 302 is shown as an example of each store buffer entry circuit. Store buffer entry circuit 302 includes store buffer entry register 360 as well as store buffer entry byte data multiplexers 362, 363, 364, 365 which correspond to data bytes 0–3 of store buffer entry 339, store buffer entry tag multiplexer 370, which corresponds to the tags of store buffer entry 339 and store buffer entry address multiplexer 372, which corresponds to the address of store buffer entry multiplexer 339. Store buffer entry circuit 302 also includes tag compare circuit 374 and address compare circuit 376. Store buffer entry register 360 includes store buffer data entry register 380, store buffer address entry register 382, store buffer tag entry register 384 and store buffer control entry register 386.

Store buffer entry register circuit 360 is a register which receives a store buffer entry 339 in parallel from store buffer entry data byte multiplexers 362–365, tag multiplexer 370 and address multiplexer 372 and provides a store buffer entry 339 in parallel to store buffer entry circuits SB1 and SB3. Additionally, store buffer data entry register 380 provides data bytes 0–3 to data port A and data port B of reservation station driver circuit 220. These data bytes are provided to allow load store functional unit 134 to perform a load forwarding operation.

Byte multiplexer circuits 362–365 receive respective bytes from A merge circuit 306, B merge circuit 308, and the four result buses as well as from store buffer entry circuits SB3, SB0 and SB1. Byte multiplexer circuits 362–365 are controlled by store buffer control signals which are provided by load store controller 182 based upon the linear addresses for each store buffer entry and matches of the linear addresses from entries in the reservation station. The result buses are controlled by store buffer control signals which are provided by load store controller 182 based upon whether a tag valid bit is present for a particular byte. If the tag valid bit is set for a particular byte, then that particular byte monitors the result buses and multiplexes whichever result bus has a value which matches the tag.

For example, byte multiplexer circuit 362 receives the byte 0 data from each of the A merge signal, B merge signal, four result signals, and store buffer entries SB3, SB0 and SB1. Based upon the store buffer control signals, byte multiplexer circuit 362 provides one of each of these data bytes as the SB2 store buffer entry which is held in store buffer register circuit 360.

Each byte which is stored in store buffer data register 380 is a direct reflection of what is stored in memory, accordingly, byte steering is provided to arrange the data bytes to correspond to what is stored in memory. Byte steering is provided by providing byte multiplexer 0 362 and byte multiplexer 1 363 with inputs from the four result bus byte 0's and the four result bus byte 1 in parallel, providing byte multiplexer 2 364 with inputs from the four result bus byte 0's, the four result bus byte 1's and the four result bus byte 2's in parallel, and providing byte multiplexer 3 365 with inputs from the four result bus byte 0's, the four result bus byte 1's and the four result bus byte 3's in parallel. Multiplexer's 2 and 3 364, 365 receive result buses bytes 0 and 1 because the L and M bytes of the result signal may correspond to any one of the byte positions in the store buffer. Whereas, result byte 2 can only correspond to data byte 2 and result byte 3 can only correspond to data byte 3.

Address multiplexer 372 receives the ADDR A signal and the ADDR B signal from reservation station 124 and provides one of these addresses to store buffer address register 382 as linear address 342. Store buffer address register 382 provides the address portion 342 of store buffer entry 339 to address compare circuit 376 which also receives the ADDR A and ADDR B signals from reservation station 124. Address compare circuit 372 compares the ADDR A and ADDR B signals to linear address 342 every clock cycle. If there is a match between ADDR A or ADDR B and linear address 342, then load store controller 182 causes reservation station 124 to read the data from store buffer data register 380 via the port which corresponds to the address compare match, rather than via the corresponding port of the data cache 150.

Tag multiplexer 370 receives the tags from store buffer entries SB0, SB1 and SB3. Tag multiplexer 370 also receives tags from the A and B tags of the reservation station entry. Tag bytes which are held in tag register 384, and are subject to forwarding, but tag register 384 does not receive tag inputs from the result buses. The tags from the result bus are monitored by tag control circuit 374. If a tag which is held by tag register 384 matches a tag from one of the result buses, then tag control circuit 374 controls byte multiplexers 362–365 to cause the result bus which provides the tag match to provide data to the corresponding store buffer data register.

Control portion 344 of store buffer entry 339 is provided by load store controller 182 to store buffer control register 386.

Store buffer entry circuits SB0, SB1 and SB3 differ only in the input signals which are provided by the other store buffer entries. More specifically, store buffer entry SB0 receives only the output from store buffer entry SB1. Store buffer entry SB1 receives the output entry from store buffer SB0 and SB2. Store buffer entry SB3 receives the output entries from store buffers SB0, SB1 and SB2.

Referring to FIGS. 6–8, store buffer 180 provides temporary storage for pending store operations. By using the store byte tags, these pending store operations need not necessarily have complete store data. Additionally, by using the store byte tags in conjunction with the store buffer entry feed back, store buffer 180 performs store forwarding operations. Additionally, because load operations may be dependent upon store operations which have not yet been stored in data cache 150, store buffer 180 can perform load forwarding operations.

For example, for a doubleword store of a register with a pending 32-bit update, the byte tags 0–3 are valid in the reservation station entry, as indicated by the respective tag valid bits. An update is pending when a functional unit is going to, but has not yet, produced a value for a store operation. If the cache access provides a cache hit, the store operation transfers to store buffer circuit 180 from reservation station entry RS0. The A operand upper byte tag ATAGU of the reservation station entry is duplicated as byte 3 and byte 2 tag in the store buffer entry. The ATAGL and ATAGM reservation station byte tags are provided as the store buffer byte 0 and byte 1 tags, respectively. (In the case of a doubleword write, all of these tags are actually the same.) None of the byte control bits B0 and B1 are set. When the result is made available by the functional unit, store buffer 180 compares each byte tag against the tags appearing on the result buses, using tag compare circuit 374 and, using multiplexers 362–365, gates in data from the respective byte of the result bus whenever there is a match on a tag. In the case of a doubleword store, each byte matches simultaneously.

For a doubleword store of a register with a pending doubleword and a subsequent pending byte update to a byte of the same doubleword, at least two tags appear in the final doubleword; the same tag is used for bytes 0, 2 and 3 and a different tag is used for byte 1. This different tag represents that the second byte store has occurred. More specifically, the first doubleword is stored in store buffer entry SB0 with four valid tags and the byte store is stored in the more significant store buffer entry SB1 with a new tag placed in byte 1 while the tags from byte 0, 2 and 3 are forwarded from SB0. Accordingly, store forwarding is achieved which provides the byte 1 result onto the result bus and writes the byte 1 result into the doubleword storage buffer entry without steering by using the byte control bits.

For a word store of a word register with a pending update to bytes 2 and 3 in memory, the tags for bytes 0 and 1 are placed into bytes 2 and 3 with the B1 bit set in byte 3 and the B0 bit set in byte 2. When this tag is driven onto the result bus, these bytes simultaneously forward from bytes 0 and 1 of the result bus which corresponds to this tag into store buffer data register 380, respectively. This example also applies to the case where there are two pending byte updates to a word which is stored in a store buffer entry. The two bytes in the store buffer entry forward from different result buses, potentially at different times.

For a byte store, a single byte is replaced with a tag having the B1 or B0 bit set depending upon whether the source byte is a high byte or a low byte. When this tag matches, it gates data from the indicated byte of the result bus. This works even for a byte store of a register that has a pending word or doubleword update. In this case, the byte is expected on the corresponding location of the result bus, even though the entire bus may contain valid data.

Sometimes when performing a store operation, the read phase of the store may receive data forwarded from a less significant store buffer entry rather than from data cache 150. As a result, store buffer 180 inserts a tag into a data word that already has a tag in it. This can happen, for example, when more than one byte is written into the same doubleword within a short span of time. Accordingly, the information that is stored in the store buffer entry can have more than one tag, each representing a different result. In operation, each tag compares against the result buses and gates in the proper byte at the proper time. Because unaligned stores are not allowed to write tags into store buffer 180, awkward forwarding cases do not occur.

When performing a load operation, address compare circuit 376 of the store buffer 180 compares the linear address which is provided by RS0 and RS1 adders to the linear addresses of the store buffer entries. If there is a match between the load address and the address stored in one of the store buffer entries as indicated by the hit signal that address compare circuit 376 provides, then load store controller 182 determines the load is dependent on the store. If the load is dependent on the store, the data from the store buffer entry which provided the linear address match is provided via whichever port the address matched was provided. This operation is referred to as a load forwarding operation.

Figure 9:
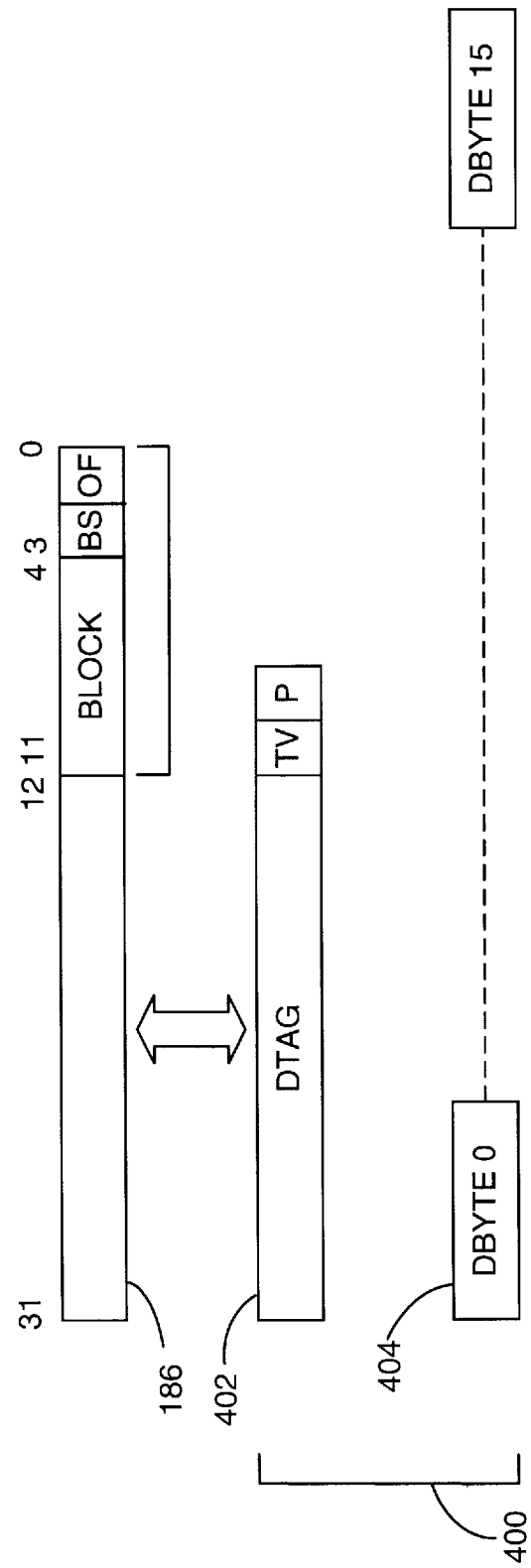
FIG. 9 is a block diagram of an entry of the FIG. 2 data cache.

Referring to FIG. 9, data cache 150 is a linearly addressed cache. Co-filed application entitled "Linearly Addressable Microprocessor Cache", which is incorporated by reference, sets forth the structure and operation of the linear addressing aspects of data cache 150 in greater detail.

An entry 400 of data cache 150 is shown. For each entry of data cache 150, the middle order bits of each linear address corresponding to the cache entry provide a cache index which is used to address the linear tag arrays and retrieve an entry from each linear tag array. The upper order bits of each linear address are compared to the linear data tags stored within the retrieved entries from address tag array 310. The lowest order bits of each linear address provide an offset into the retrieved entry to find the actual byte addressed by the linear address. Because data cache 150 is always accessed in 32-bit words, these lowest order bits are not used when accessing data cache 150.

Data cache entry 400 of data cache 150 includes linear address tag entry 402 and data entry 404. Data entry 404 includes a sixteen byte (DBYTE0–DBYTE 15) block of data. Data linear address tag entry 402 includes a data linear tag value (DTAG), linear tag valid bit (TV), and valid physical translation bit (P). The data linear tag value, which corresponds to the upper 21 bits of the linear address, indicates the linear block frame address of a block which is stored in the corresponding store array entry. The linear tag valid bit indicates whether or not the linear tag is valid. The valid physical translation bit indicates whether or not an entry provides a successful physical tag hit as discussed below.

Figure 10A:
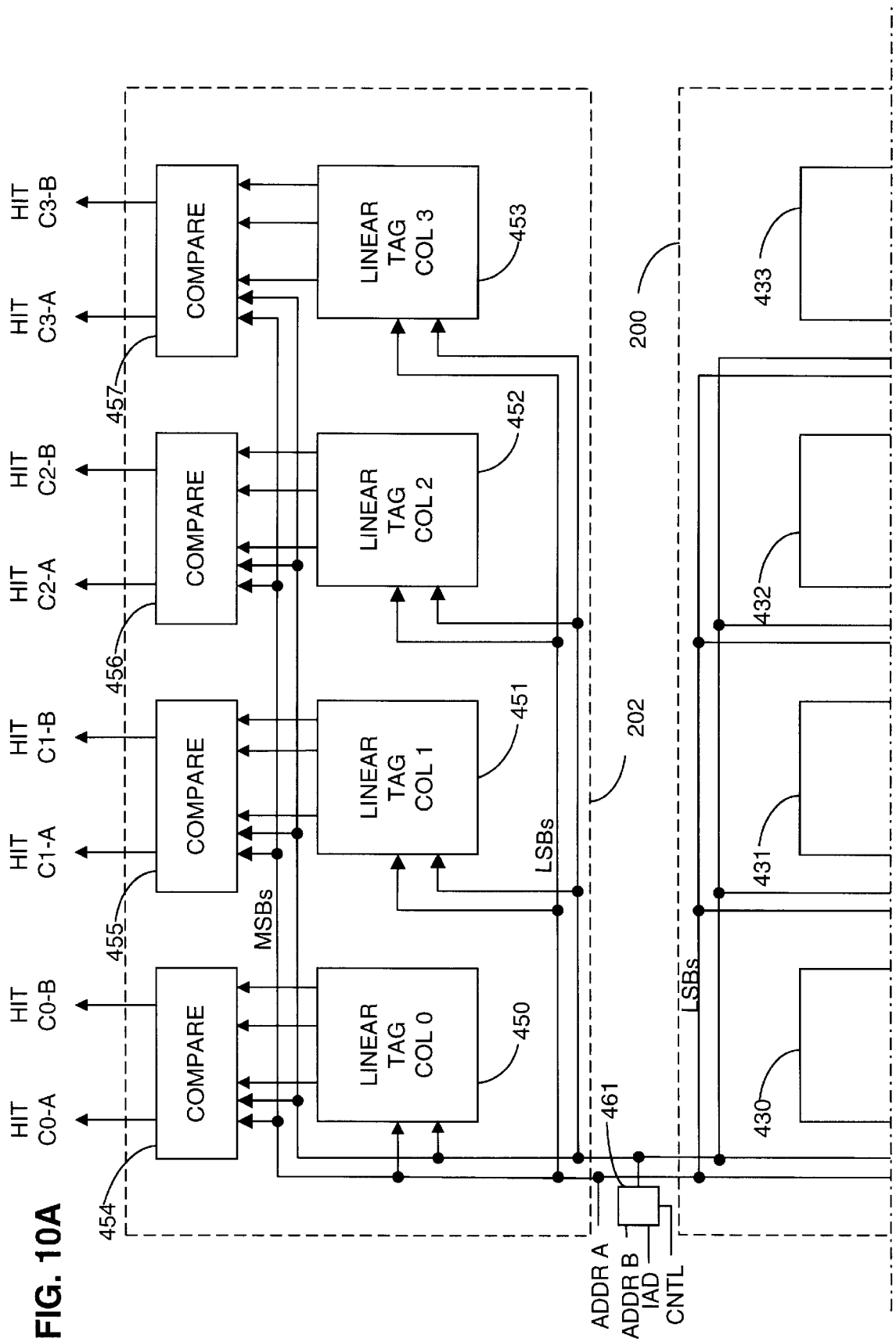

Referring to FIG. 10, data cache linear tag circuit 202 and data cache store array 200 of linearly addressable data cache 150 are shown. Data cache 150 is arranged in four 2-Kbyte columns, column 0, column 1, column 2, and column 3. Data linear tag circuit 202 simultaneously receives the two linear addresses ADDR A, ADDR B and data store array 312 simultaneously provides the two data signals DATA A, DATA B, i.e., data cache 150 functions as a dually accessed data cache.

Data store array 200 includes four separate data store arrays, column 0 store array 430, column 1 store array 431, column 2 store array 432, and column 3 store array 433 as well as multiplexer (MUX) circuit 440. Multiplexer 440 receives control signals from data linear tag circuit 202 which indicate whether there is a match to a linear tag value stored in a respective linear tag array. Multiplexer 440 receives the data from store arrays 430–433 and provides this data to load store functional unit 134.

Linear tag circuit 202 includes linear tag arrays 450–453 corresponding to columns 0–3. Each linear tag array is coupled with a corresponding compare circuit 454–457. Accordingly each column of data cache 150 includes a store array, a linear tag array and a compare circuit. Store arrays 430–433, address tag arrays 450–453, and compare circuits 454–457 all receive the linear addresses, ADDR A, ADDR B from load store section 134.

IAD bus 102 is coupled to each store array 430–433 via store address multiplexer 461 to provide a store address to each store arrays 430–433. IAD bus 102 is also coupled to store register 460 which is coupled to each store array 430–433. The store address, which is provided by IAD bus 102, is provided to index a particular column and to select a particular bank; the particular column is selected by column select bits, which are provided either by store buffer 180 when performing a store or by physical tag circuit 162 when performing a reload. For a store, only one bank is accessed. The bank select bits, bits 2 and 3 of the address which is provided by IAD bus 102, are used to access the bank. For a reload, all four banks are accessed in parallel.

IAD bus 102 is used during both store operations and reload operations to write data to store arrays 430–433 of data cache 150. When performing a store operation, data is written in store arrays 430–433, via store register 460, in 32-bit doublewords. For a store buffer write, the IAD bus address, which is provided to the ADDR B input to data cache 150. ADDR B and IAD address are multiplexed by address multiplexer 461.

When performing a reload operation, data is written into store arrays 430–433 in 128-bit lines. Store register 460 collects 128 bits of data from IAD bus 102 in two 64-bit accesses; after the 128 bits is collected, store register 460 writes this data to store arrays 430–433. For a reload, store register 460 multiplexes the address lines of IAD bus 102 to receive data, because 64-bits are written in each phase. Address multiplexer 461 multiplexes the IAD address onto the ADDR B address path to index into the rows. Data cache store address multiplexer 460 is controlled by data cache controller 190 based upon whether a store or a load operation is being performed. For a reload operation, load store controller 134 writes the reload address via port A of data cache 150; accordingly, data cache 150 uses ADDR A for a reload address.

Figure 11:
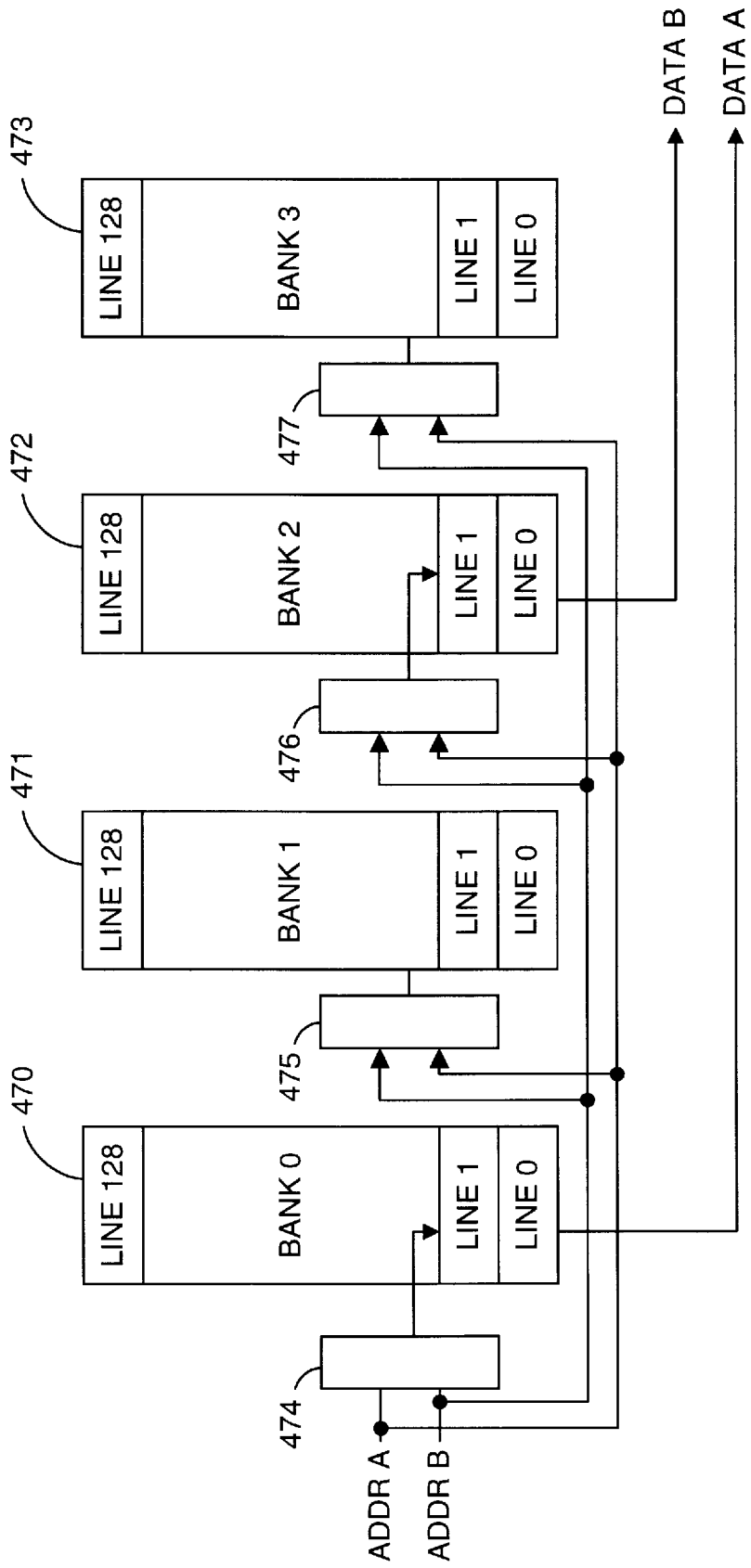
FIGS. 11 and 12 are block diagrams of the banking structure of the FIG. 10 store array.
Figure 12:
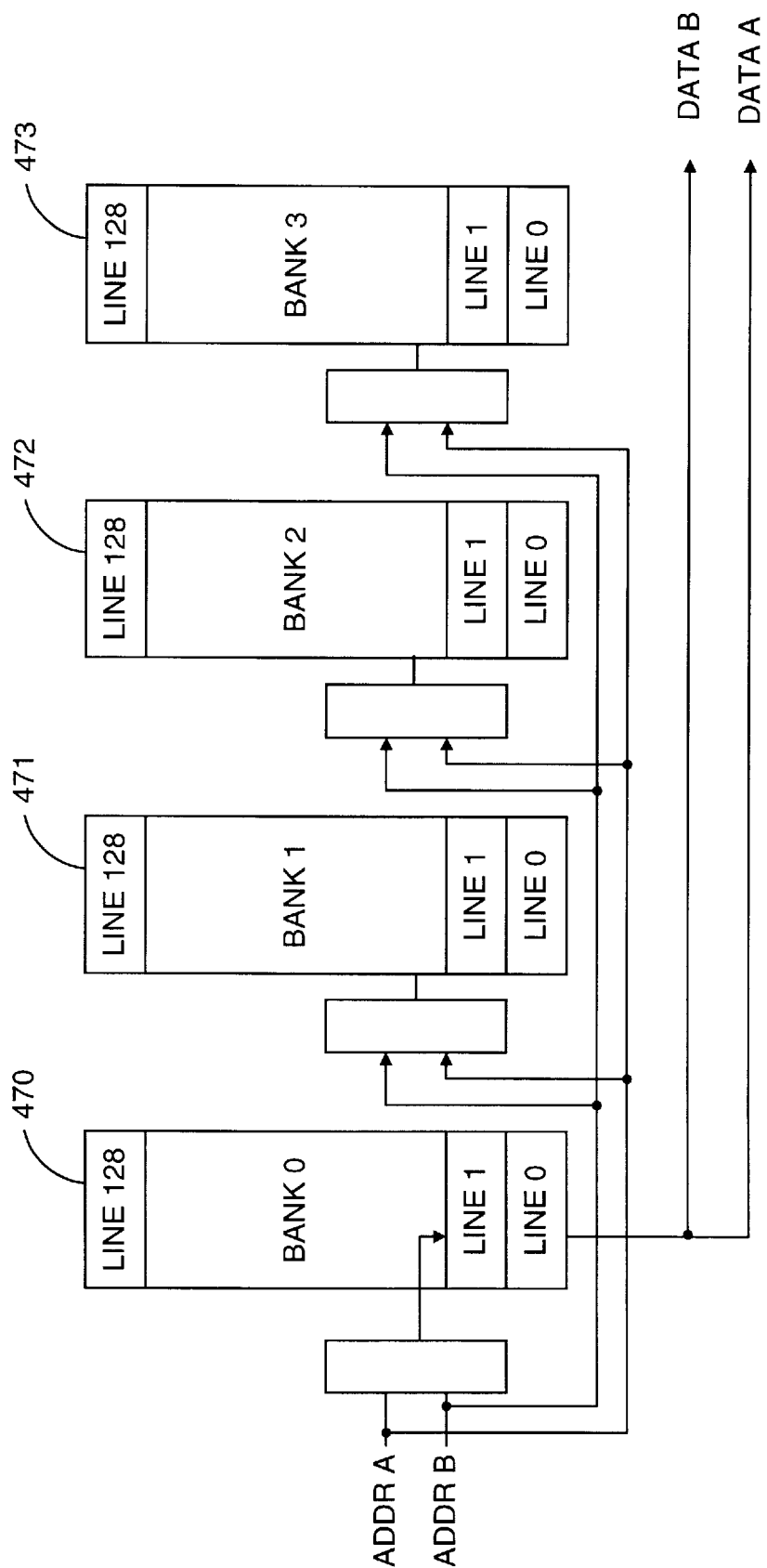
Figure 13:
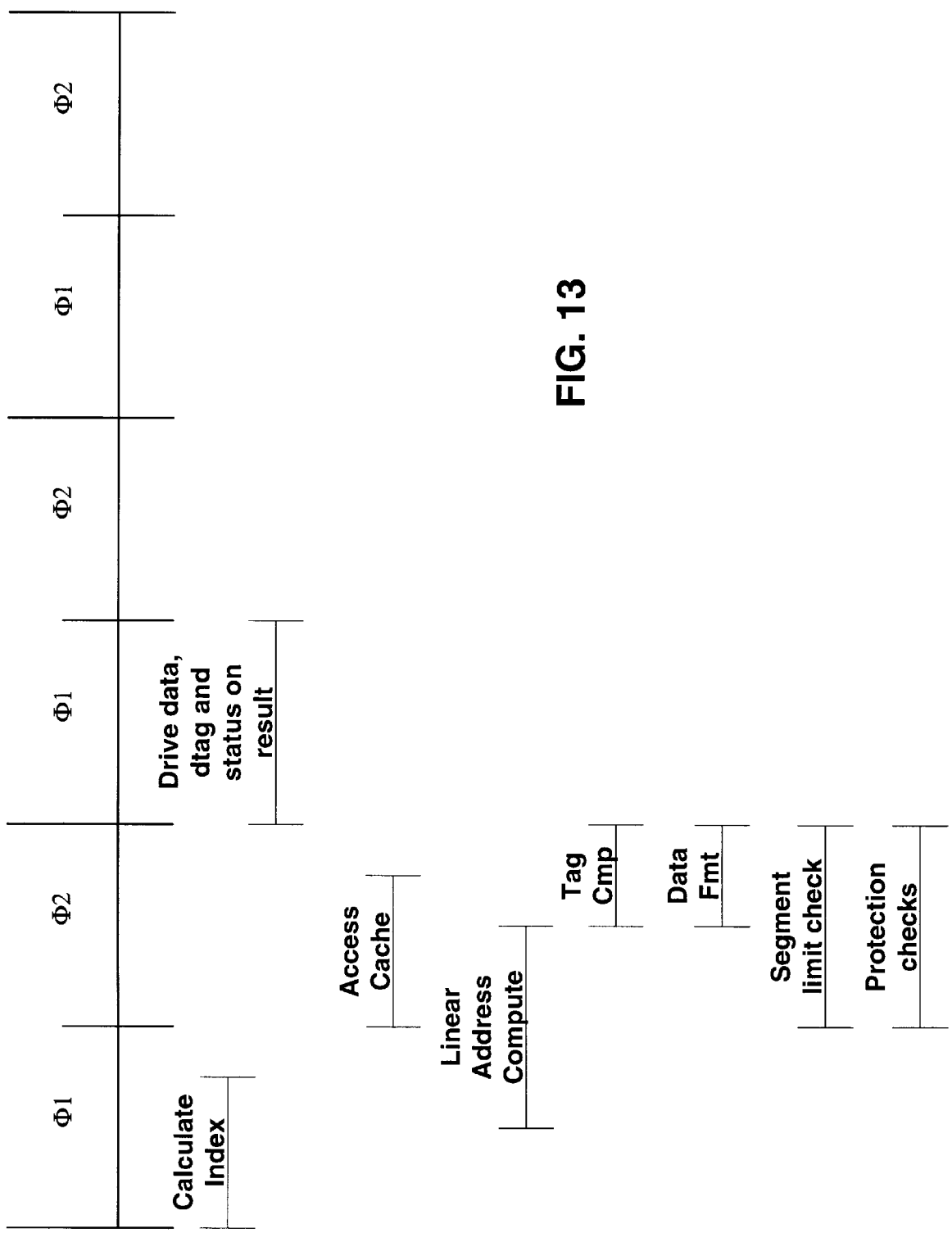
FIG. 13 is a timing diagram of a load operation in accordance with the present invention.
Figure 14:
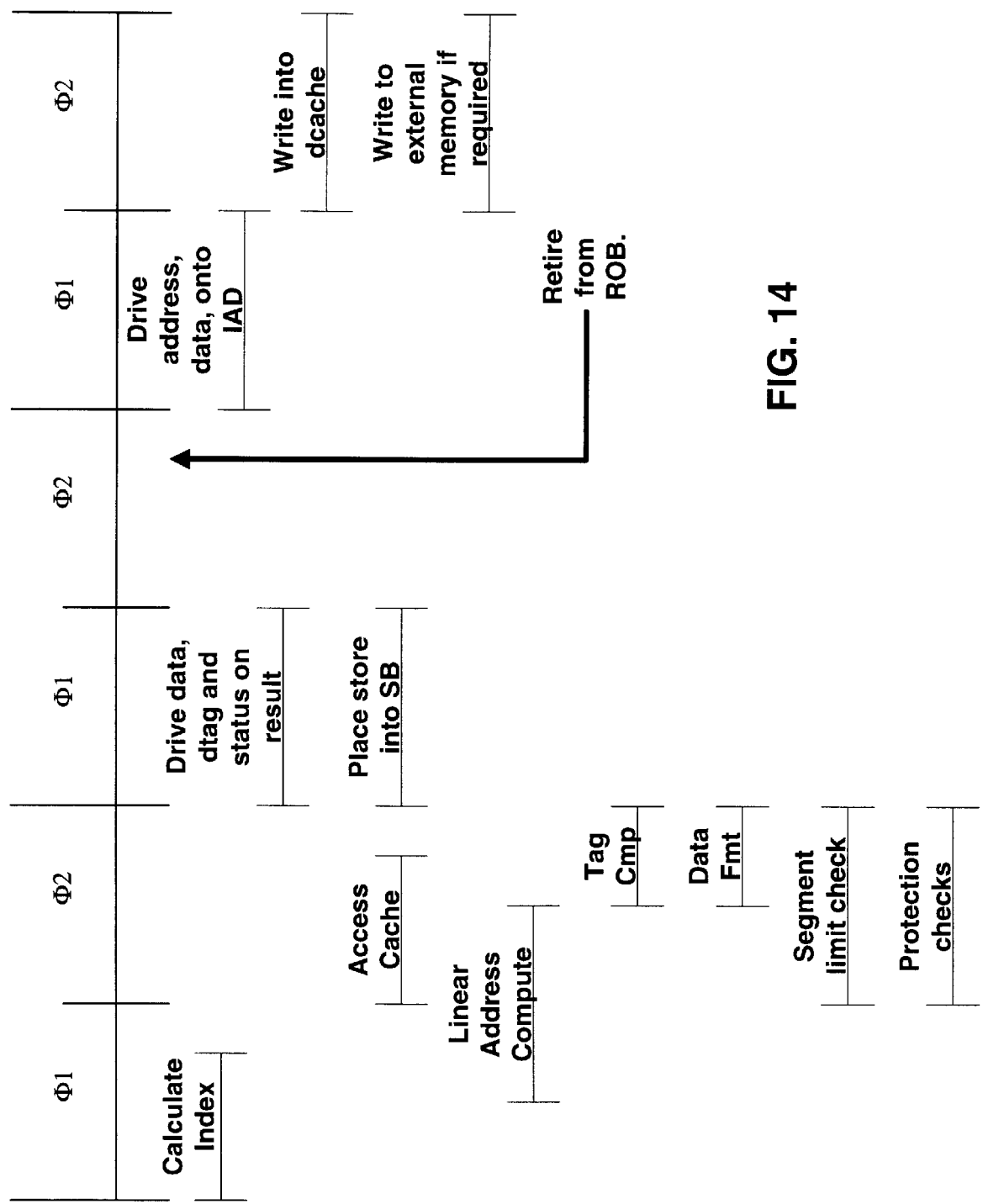
FIG. 14 is a timing diagram of a store operation in accordance with the present invention.
Figure 15:
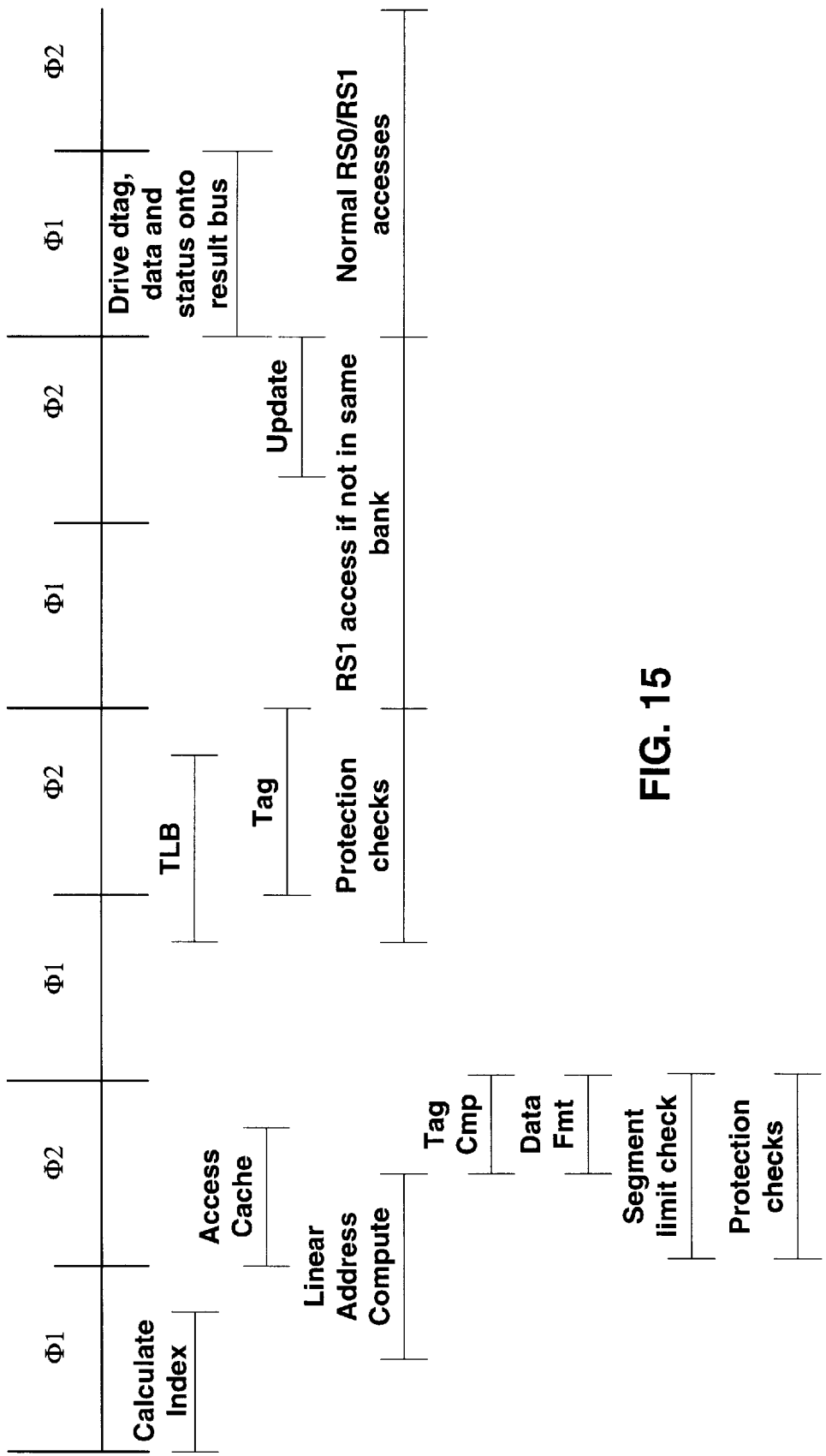
FIG. 15 is a timing diagram of a data cache miss during a speculative access operation in accordance with the present invention.
Figure 16:
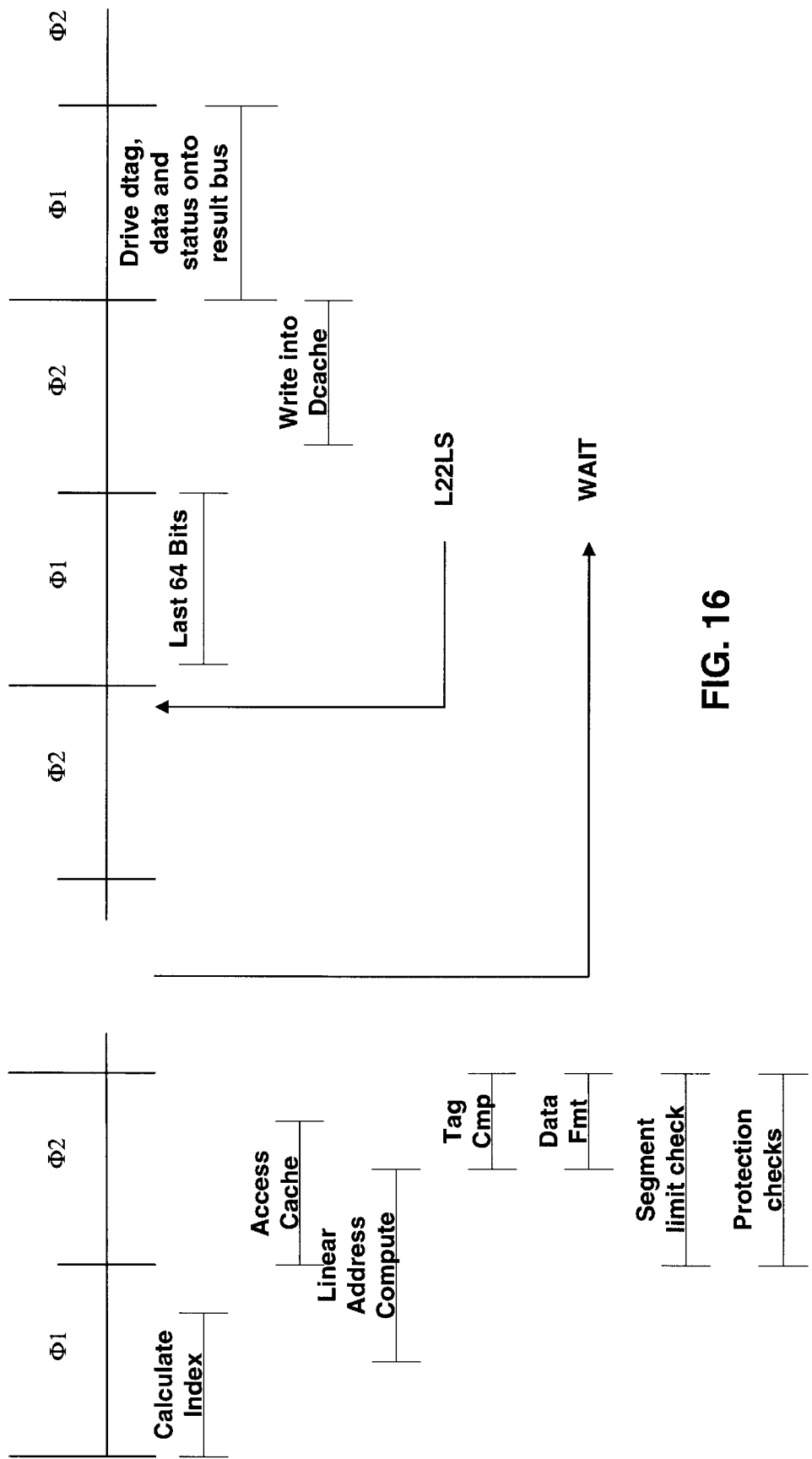
FIG. 16 is a timing diagram of a data cache reload operation in accordance with the present invention.

Referring to FIGS. 11 and 12, each store array of data cache 150 is banked to allow multiple accesses in a single clock cycle without requiring the overhead associated with dual porting. More specifically, each store array includes four banks 470–473 which each store a 32-bit double word of data; each bank includes a respective bank address multiplexer 474–477. The combination of the four banks provides access to a single line of data cache 150.

Each bank 470–473 is individually addressed by either ADDR A or ADDR B, which address is provided by a respective bank address multiplexer 474–477. Bank address multiplexers 474–477 are controlled by the bank select bits of the ADDR A and ADDR B. Because each bank is individually addressed, more than one bank may be accessed simultaneously.

For example, as seen in FIG. 11, when ADDR A addresses a line of bank 0 and ADDR B addresses the same line of bank 2, then multiplexer 474 causes ADDR A to be provided to bank 0 and multiplexer 477 causes ADDR B to be provided to bank 2. The data word which is addressed by ADDR A is provided to load/store functional unit 134 as DATA A via the DATA A data path and the data word which is addressed by ADDR B is provided to load/store functional unit 134 as DATA B via the DATA B data path.

As seen in FIG. 12, when ADDR A and ADDR B both address the same line of bank 0, then only this line and bank is accessed and the data at this location is provided to load/store functional unit 134 as both DATA A and DATA B via the DATA A and DATA B data paths, respectively.

When the two accesses are to the same bank but different lines, then the port B access is stalled for one cycle by data cache controller 190. Because data cache accesses are generally random, as compared to instruction cache accesses which have strong locality, the frequency of port A, port B accesses to the same bank, different lines are relatively low.

Store accesses to data cache 150 are via IAD bus 102. During a store, multiplexers 474–478 use the store access to control which of banks 470–473 is written with the 32-bit store double word. During a reload, banks 470–473 are written in one 128-bit line after the reload data has been accumulated in store register 460.

Referring to FIGS. 2, 9–11, the general operation of data cache 150 is discussed. When a data value that is not stored in cache 150 is requested by load/store functional unit 134, then a cache miss results. Upon detecting a cache miss, the requested value is written into an entry of data cache 150. More specifically, load store section 134 translates the logical address for the value to a linear address. This linear address is provided to memory management unit 164. The linear address of the value is checked against the linear tag portion of the memory management unit's TLB array by a TLB compare circuit to determine whether there is a TLB hit.

If load store functional unit 134 determines that there was a TLB hit, then load store functional unit 134 examines the data to determine whether the data is cacheable. If the data is cacheable and there is a TLB hit, then the physical tag of the corresponding physical address is written into a corresponding entry of physical tag circuit 162. The data linear tag array 450–453 which corresponds to the array column in which the data was stored is written with the linear tag from the TLB array.

If there is not a TLB hit, then the TLB array is updated by memory management unit 164 to include the address of the requested value so that a TLB hit results. Then the physical tag is written to physical tag circuit 162 and the linear tag is written to the appropriate linear tag array 450–453.

A pre-fetch request is then made by load/store functional unit 134 to the external memory and the value which is stored in the external memory at the physical address which corresponds to the linear address is retrieved from the external memory. This value is stored in the bank, line and column of store array 200 which corresponds to the line and column locations of the value's linear tags which are stored in the linear tag arrays. The corresponding linear tag valid bit and valid physical translation bit in the linear tag array 310 are set to indicate that the entry corresponding to the linear tag is valid, that the linear tag is valid and that the entry provides a successful physical translation.

When the linear address for this value is again requested by load/store functional unit 134, load store section 134 converts the logical address to the linear address which provides a match of the linear tags in linear address tag array 310 with the requested address. Because the valid bit is set and the valid physical translation bit is set, a linear address hit occurs, and the entry which is stored in the corresponding line of data store array 304 is provided to load/store functional unit 134. During the access by load store section 134, there is no need to access either the physical address tag circuit 162 or TLB circuit 164 since the valid physical translation bit is set indicating that the entry has a valid physical translation.

Referring to FIGS. 1–10 and FIG. 13, when a load operation is being performed by load/store functional unit 134 via port A and the data value to be loaded is available in data cache 150, then a data cache hit results. More specifically, during Φ1 of cycle 1, the cache index is calculated by adder 240 or RS0 adder 216; the cache index is the least significant 11 bits of the linear address and is calculated as part of the linear address compute. This cache index linear address is used to access the appropriate line and bank of data cache store array 200. When the appropriate line and bank is accessed, the linear address, which is calculated by adder 242, is used to access the appropriate column of store array 200 by comparing the linear tags. The data value is then returned to driver circuit 220 of reservation station circuit 124 via the DATA A data path. This data value is formatted by driver circuit 220 for providing to the result bus 0. During Φ2 of cycle 1, limit check circuit 252 performs a segment limit check and a protection check, as is well known in the art, on the linear address. During Φ1 of cycle 2, the data value and corresponding destination tags are driven onto result bus 0 for port A.

While a load operation is performed via port A, a corresponding load operation may be performed via port B. This corresponding load operation uses reservation station RS1 along with its corresponding adder to perform the address generation of the data cache access. The data value and corresponding destination tags for the entry in reservation station RS1 are driven onto result bus 1.

Referring to FIGS. 1–10 and FIG. 14, when a store operation is being performed by load/store functional unit 134 via port A and the data value to be stored is already stored in data cache 150, then a data cache hit results. Because stores are performed as read modify write operation, the first portion of a store operation is similar to a load operation. After the data value is loaded, then the loaded value is written to store buffer circuit 180 in order to modify the loaded data value.

More specifically, during Φ1 of cycle 1, the cache index is calculated by adder 240 or RS0 adder 216; the cache index is the least significant 11 bits of the linear address and is calculated as part of the linear address compute. This cache index linear address is used to access the appropriate line and bank of data cache store array 200. When the appropriate line and bank is accessed, the linear address, which is calculated by adder 242, is used to access the appropriate column of store array 200 by comparing the linear tags. The data value is then returned to driver circuit 220 of reservation station circuit 124 via the DATA A data path. This data value is formatted by driver circuit 220 for providing to the result bus 0. During Φ2 of cycle 1, limit check circuit 252 performs a segment limit check and a protection check, as is well known in the art, on the linear address. During Φ1 of cycle 2, the data value and corresponding destination tags are driven onto result bus 0 for port A and are also stored in the next available entry of store buffer circuit 180. This value is held in store buffer circuit 180 until the store operation is retired from reorder buffer 114, which occurs when there are no other instructions pending. Reorder buffer 114, then indicates to load/store controller 180, using the load store retire signal, that the store instruction may be retired, i.e., that the store may be performed. Because stores actually modify the state of the data value, stores are not speculatively performed and must wait until it is clear that the store is actually the next instruction before reorder buffer 114 allows the store to be executed.

After Reorder buffer 114 has indicated that the instruction may be performed, the data value and corresponding linear address are driven to IAD bus 102 during Φ1 of the cycle following the release of the instruction. During Φ2 of this cycle, the data value is written to the appropriate line and bank of data cache store array 200. Additionally, if physical tag circuit 162 indicates that the value should also be written externally, then the data value is written to external memory at the physical address location which corresponds to the linear address. The physical address translation is performed by memory management unit 164, which also receives the linear address from IAD bus 102.

Referring to FIGS. 1–10 and 15, when a speculative load operation is being performed by load/store functional unit 134 and the data value to be loaded is not available in data cache 150, then a speculative data cache miss results. The first cycle of the load operation is the same as if a cache hit had resulted.

When cache 150 is accessed and the cache miss resulted then during cycle 2, the TLB is accessed in memory management unit 164 and the physical tags are accessed in physical tag circuit 162 to determine the physical address of the data value. This physical address is then checked within memory management unit 164 to confirm that the physical address does not violate any protection checks. During the next cycle, if the port B access is not to the same bank of cache array 200, then port B initiates another cache access. Additionally during Φ2 of this cycle, cache array 200 is updated with the tag valid bits of the line from the tag buses. During the next cycle, the data value, destination tag and status are driven onto the next available result bus and normal operation, which assumes cache hits, resumes.

Referring to FIGS. 1–10 and 16, during a cache reload, the first cycle of the reload operation is the same as if a cache hit had resulted. However, after cache controller 190 determines that a cache miss resulted, then load/store functional unit 134 waits store buffer circuit 180 to empty before accessing external memory to reload cache 150. After waiting several clock cycles, physical tag circuit 162 provides a data available signal (L22LS) which indicates to cache 150 all 128-bits of data has been written to store register 460. After the data is available and written into data cache array 200, then the data, destination tag and status information is driven onto result bus 0 by driver circuit 220 of reservation station circuit 124.

Figure 17:
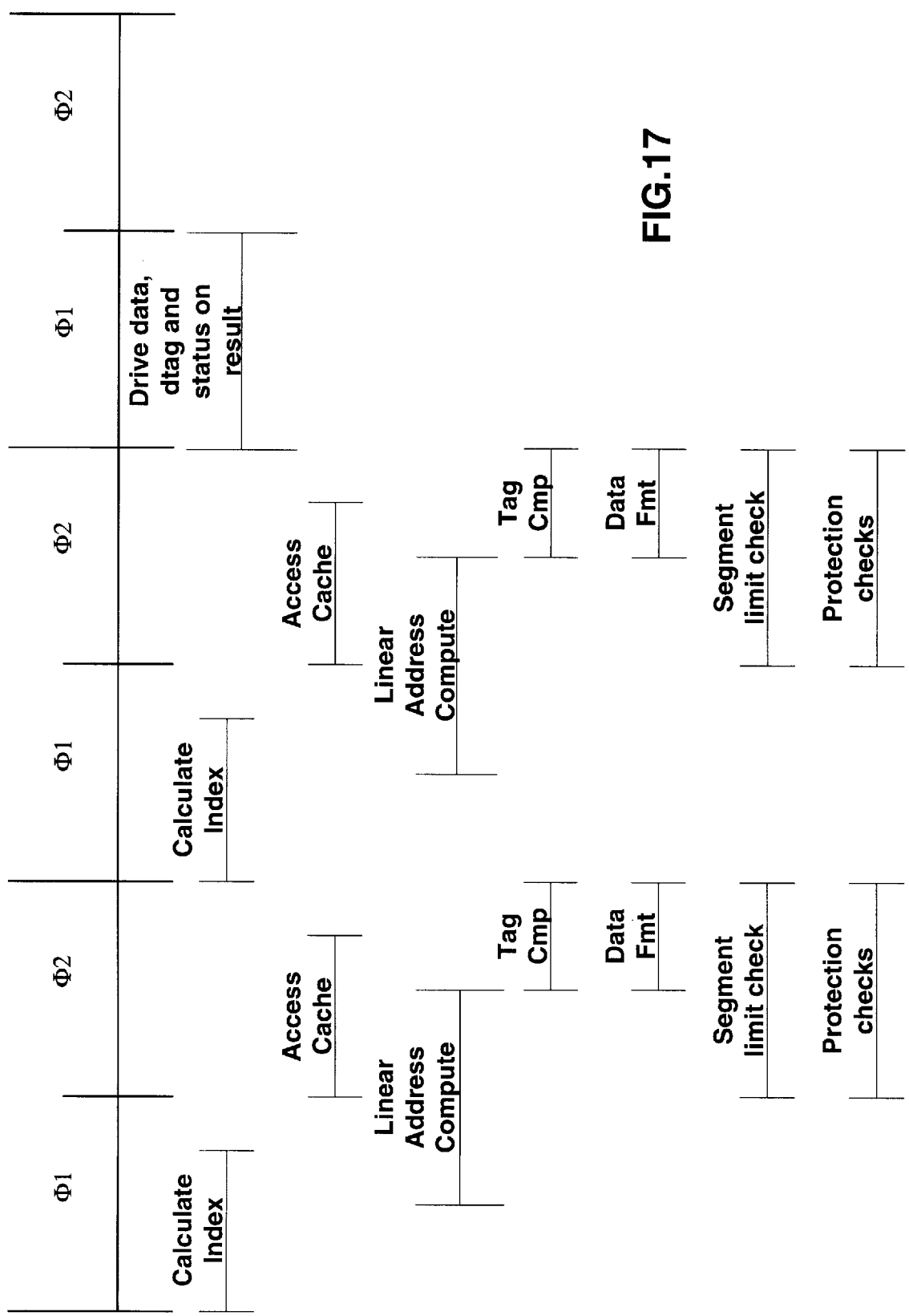
FIG. 17 is a timing diagram of a misaligned access operation in accordance with the present invention.

Referring to FIG. 17, for a misaligned access there are two access during subsequent cycles. Each of the two accesses is the same as cache hit access. The data which is returned from each access is accumulated by driver circuit 220. After the two accesses are complete, and the data has been accumulated, the data is formatted, as discussed above, by driver circuit 220. The data, destination tag and status information is then driven onto result bus 0 by driver circuit 220 of reservation station circuit 124. Misaligned accesses are only performed using reservation station 0. Accordingly, only the RS0 adder and the port A portion of driver circuit 220 required the circuitry necessary for performing misaligned accesses.

Other Embodiments

Other embodiments are within the following claims.

For example, load/store functional unit 134 may be divided into two separate functional units, a load functional unit and a store functional unit. In this embodiment, the operation of the functional units would be substantially the same as described, however, each functional unit would include a respective reservation station. I.e., the load section includes a load reservation station which functions as discussed with reference to loads and the store section includes a store reservation station which functions as discussed with reference to stores.

What is claimed is:

1. An apparatus for performing a plurality of load operations in parallel comprising:
   a load functional unit, the load functional unit including
      a reservation station circuit for temporarily holding load operations, the reservation station circuit including
         a first reservation station entry and a second reservation station entry, the second reservation station entry being coupled to the first reservation station entry and providing a reservation station entry output to the first reservation station entry,
      an input signal multiplexer circuit, the input signal multiplexer circuit receiving load signals in parallel and providing a first load signal to the first and second reservation station entries and a second load signal to the first and second reservation station entries, and
      a reservation station driver circuit, the reservation station driver circuit receiving data cache data in parallel and providing the data cache data to first and second result buses in parallel; and
   a load control circuit for controlling which of the first and second load signals is received by the first and second reservation station entries, and
   a data cache including a store array and a data cache controller, the store array including a plurality of banks, each of the plurality of banks being coupled to the first and second reservation station entries of the load functional unit via respective first and second data cache ports, the store array providing the data cache data in parallel to the load functional unit in response to the first and second load signal, the data cache controller being coupled to the load control circuit.

2. The apparatus of claim 1 wherein the load control circuit controls which load signal is received by which of the first and second reservation entries in response to a type code match signal, the type code match signal being generated by the load control circuit when a type code from a type code bus matches a predetermined load functional unit type code.

3. The apparatus of claim 1 wherein
   the reservation station circuit further includes a third reservation station entry, the third reservation station entry being coupled to the second reservation station entry and providing a third reservation station entry output to the second reservation station entry, the third reservation station entry being coupled to the first reservation station entry and providing the third reservation station entry output to the first reservation station entry, one of the first and second reservation station entries receiving the third reservation station entry output under control of the load control circuit.

4. The apparatus of claim 3 wherein
   the reservation station circuit further includes a fourth reservation station entry, the fourth reservation station entry being coupled to the third reservation station entry and providing a fourth reservation station entry output to the third reservation station entry, the fourth reservation station entry being coupled to the second reservation station entry and providing the fourth reservation station entry output to the second reservation station entry, one of the third and second reservation station entries receiving the fourth reservation station entry output under control of the load control circuit.

5. The apparatus of claim 1 wherein the reservation station circuit further includes
   first and second adder circuits coupled to the first and second reservation station entries, respectively, the first and second adder circuits receiving the load signals and providing cache address signals based upon the load signals, the cache address signals accessing respective first and second locations within the data cache store array.

6. The apparatus of claim 5 wherein the first and second adder circuits each include
   a logical address adder for receiving a plurality of address component signals and providing a logical address signal, and a linear address adder for receiving the logical address signal and a segment base signal and providing a linear address.

7. The apparatus of claim 6 wherein the address component signal includes an A operand adder signal, a B operand adder signal and a displacement adder signal.

8. The apparatus of claim 7 wherein the first adder circuit further includes an A operand multiplexer circuit for receiving an A operand signal and a zero signal and providing one of these signals as the A operand adder signal in response to address mode control information from the load controller, a B operand multiplexer circuit for receiving a B operand signal and a misaligned address one signal and providing one of these signals as the B operand adder signal in response to address mode control information from the load controller, and a displacement multiplexer circuit for receiving a displacement signal, a four signal and a five signal and providing one of these signals as the displacement adder signal in response to address mode control information from the load controller.

9. The apparatus of claim 7 wherein the second adder circuit further includes an A operand multiplexer circuit for receiving an A operand signal and a zero signal and providing one of these signals as the A operand adder signal in response to address mode control information from the load controller, and a B operand multiplexer circuit for receiving a B operand signal and a misaligned address one signal and providing one of these signals as the B operand adder signal in response to address mode control information from the load controller and wherein a displacement signal is provided directly to the logical address adder.

10. A load/store functional unit of a microprocessor, the load/store functional unit performing load operations and store operations to a cache in parallel, the cache including a plurality of banks the load/store functional unit comprising:

a reservation station circuit for temporarily holding load operations and store operations, the reservation station circuit including first and second reservation station entries, the first and second reservation station entries being coupled to first and second ports of the cache, the first and second ports of the cache being coupled to each of the plurality of banks;

a store buffer circuit for temporarily holding store operations, the store buffer circuit including first and second store buffer entries for temporarily holding store operations, at least one of the store buffer entries being coupled to at least one of the reservation station entries; and a control circuit for controlling the reservation station entries and the store buffer entries, the control circuit being coupled to the reservation station circuit, to the store buffer circuit and to the cache.

11. An apparatus for processing information, comprising:
an external memory for holding the information; and
a processor coupled with the external memory via a processor bus, the processor including
a cache for temporarily storing the information, the cache being coupled to the external memory, the cache including a plurality of banks; and a load/store functional unit for performing load operations and store operations, the load/store functional unit including a reservation station circuit for temporarily holding load operations and store operations, the reservation station circuit including first and second reservation station entries, the first and second reservation station entries being coupled to first and second ports of the cache, the first and second ports of the cache being coupled to each of the plurality of banks;

a store buffer circuit for temporarily holding store operations, the store buffer circuit including first and second store buffer entries for temporarily holding store operations, at least one of the store buffer entries being coupled to at least one of the reservation station entries; and a control circuit for controlling the reservation station entries and the store buffer entries, the control circuit being coupled to the reservation station circuit, to the store buffer circuit and to the cache.

12. A load functional unit for performing a plurality of load operations from memory in parallel, the memory including a store array having banks coupled to the load functional unit in parallel and providing data to the load functional unit in parallel in response to load signals, the load functional unit comprising:

a reservation station circuit for temporarily holding load operations, the reservation station circuit including a first reservation station entry and a second reservation station entry, the second reservation station entry being coupled to the first reservation station entry and providing a reservation station entry output to the first reservation station entry, an input signal multiplexer circuit, the input signal multiplexer circuit receiving load signals in parallel and providing a first load signal to the first and second reservation station entries and a second load signal to the first and second reservation station entries, and a reservation station driver circuit, the reservation station driver circuit receiving the data cache data in parallel and providing the data cache data to first and second result buses in parallel; and a load control circuit for controlling which of the first and second load signals is received by the first and second reservation station entries.

13. The load functional unit of claim 12 wherein the load control circuit controls which load signal is received by which of the first and second reservation entries in response to a type code match signal, the type code match signal being generated by the load control circuit when a type code from a type code bus matches a predetermined load functional unit type code.

14. The load functional unit of claim 12 wherein
the reservation station circuit further includes a third reservation station entry, the third reservation station entry being coupled to the second reservation station entry and providing a third reservation station entry output to the second reservation station entry, the third reservation station entry being coupled to the first reservation station entry and providing the third reservation station entry output to the first reservation station entry, one of the first and second reservation station entries receiving the
third reservation station entry output under control of the load control circuit.

15. The load functional unit of claim 14 wherein the reservation station circuit further includes a fourth reservation station entry, the fourth reservation station entry being coupled to the third reservation station entry and providing a fourth reservation station entry output to the third reservation station entry, the fourth reservation station entry being coupled to the second reservation station entry and providing the fourth reservation station entry output to the second reservation station entry, one of the third and second reservation station entries receiving the fourth reservation station entry output under control of the load control circuit.

16. The load functional unit of claim 12 wherein the reservation station circuit further includes first and second adder circuits coupled to the first and second reservation station entries, respectively, the first and second adder circuits receiving the load signals and providing cache address signals based upon the load signals, the cache address signals accessing respective first and second locations within the data cache store array.

17. The load functional unit of claim 16 wherein the first and second adder circuits each include a logical address adder for receiving a plurality of address component signals and providing a logical address signal, and a linear address adder for receiving the logical address signal and a segment base signal and providing a linear address.

18. The load functional unit of claim 17 wherein each address component signal includes an A operand adder signal, a B operand adder signal and a displacement adder signal.

19. The load functional unit of claim 18 wherein the first adder circuit further includes an A operand multiplexer circuit for receiving an A operand signal and a zero signal and providing one of these signals as the A operand adder signal in response to address mode control information from the load controller, a B operand multiplexer circuit for receiving a B operand signal and a misaligned address one signal and providing one of these signals as the B operand adder signal in response to address mode control information from the load controller, and a displacement multiplexer circuit for receiving a displacement signal, a four signal and a five signal and providing one of these signals as the displacement adder signal in response to address mode control information from the load controller.

20. The load functional unit of claim 18 wherein the second adder circuit further includes an A operand multiplexer circuit for receiving an A operand signal and a zero signal and providing one of these signals as the A operand adder signal in response to address mode control information from the load controller, and a B operand multiplexer circuit for receiving a B operand signal and a misaligned address one signal and providing one of these signals as the B operand adder signal in response to address mode control information from the load controller and wherein a displacement signal is provided directly to the logical address adder.

21. The apparatus of claim 1, wherein the plurality of banks are individually addressable.

22. The apparatus of claim 1, wherein each of the plurality of banks is coupled to a respective bank address multiplexer for receiving a first cache address signal and a second cache address signal from the reservation station circuit, the first cache address signal including first address bank select bits, the second cache address signal including second address bank select bits, each of the respective bank address multiplexers providing the first and second cache address signals to the respective bank in response to the first and second address bank select bits.

23. The apparatus of claim 5, wherein each of the plurality of banks is coupled to a respective bank address multiplexer, each respective bank address multiplexer receiving the cache address signals, each of the cache address signals including respective bank select bits for controlling the respective bank address multiplexer.

24. The apparatus of claim 11, wherein the plurality of banks are individually addressable.

25. The apparatus of claim 11, wherein each of the plurality of banks is coupled to a respective bank address multiplexer for receiving a first cache address signal and a second cache address signal from the reservation station circuit, the first cache address signal including first address bank select bits, the second cache address signal including second address bank select bits, each of the respective bank address multiplexers providing the first and second cache address signals to the respective bank in response to the first and second address bank select bits.

26. The load functional unit of claim 12, wherein the banks are individually addressable.

27. The apparatus of claim 12, wherein each of the plurality of banks is coupled to a respective bank address multiplexer for receiving a first cache address signal qand a second cache address signal from the reservation station circuit, the first cache address signal including first address bank select bits, the second cache address signal including second address bank select bits, each of the respective bank address multiplexers providing the first and second cache address signals to the respective bank in response to the first and second address bank select bits.

28. The apparatus of claim 16, wherein each of the plurality of banks is coupled to a respective bank address multiplexer, each respective bank address multiplexer receiving the cache address signals, each of the cache address signals including respective bank select bits for controlling the respective bank address multiplexer.

* * * * *